(12) United States Patent
Gorobets et al.

(10) Patent No.: US 8,417,876 B2
(45) Date of Patent: Apr. 9, 2013

(54) USE OF GUARD BANDS AND PHASED MAINTENANCE OPERATIONS TO AVOID EXCEEDING MAXIMUM LATENCY REQUIREMENTS IN NON-VOLATILE MEMORY SYSTEMS

(75) Inventors: Sergey Anatolievich Gorobets, Edinburgh (GB); Robert George Young, Edinburgh (GB); Alan David Bennett, Edinburgh (GB)

(73) Assignee: SanDisk Technologies Inc., Plano, TX (US)

(*) Notice: Subject to any disclaimer, the term of this patent is extended or adjusted under 35 U.S.C. 154(b) by 305 days.

(21) Appl. No.: 12/821,759

(22) Filed: Jun. 23, 2010

(65) Prior Publication Data

US 2011/0320685 A1   Dec. 29, 2011

(51) Int. Cl.
*G06F 12/06* (2006.01)
(52) U.S. Cl. ......... 711/103; 711/E12.008; 711/E12.009
(58) Field of Classification Search .................. 711/103, 711/E12.008, E12.009
See application file for complete search history.

(56) References Cited

U.S. PATENT DOCUMENTS

| | | |
|---|---|---|
| 5,070,032 A | 12/1991 | Yuan et al. |
| 5,095,344 A | 3/1992 | Harari |
| 5,313,421 A | 5/1994 | Guterman et al. |
| 5,315,541 A | 5/1994 | Harari et al. |
| 5,343,063 A | 8/1994 | Yuan et al. |
| 5,570,315 A | 10/1996 | Tanaka et al. |
| 5,595,924 A | 1/1997 | Yuan et al. |
| 5,661,053 A | 8/1997 | Yuan |
| 5,768,192 A | 6/1998 | Eitan |
| 5,822,781 A | 10/1998 | Wells et al. |
| 5,903,495 A | 5/1999 | Takeuchi et al. |
| 5,930,167 A | 7/1999 | Lee et al. |
| 5,936,971 A | 8/1999 | Harari et al. |
| 6,011,725 A | 1/2000 | Eitan |
| 6,046,935 A | 4/2000 | Takeuchi et al. |
| 6,222,762 B1 | 4/2001 | Guterman et al. |
| 6,456,528 B1 | 9/2002 | Chen |

(Continued)

FOREIGN PATENT DOCUMENTS

| | | |
|---|---|---|
| WO | WO 00/49488 | 8/2000 |
| WO | WO 03/027828 | 4/2003 |
| WO | WO 2008/019218 | 2/2008 |

OTHER PUBLICATIONS

Notification of Transmittal of the International Search Report and the Written Opinion of the International Searching Authority, or the Declaration for International Application No. PCT/US2011/039845 mailed Oct. 31, 2011, 9 pages.

(Continued)

*Primary Examiner* — Hal Schnee
(74) *Attorney, Agent, or Firm* — Davis Wright Tremaine LLP

(57) ABSTRACT

Techniques are presented for performing maintenance operations, such as garbage collection, on non-volatile memory systems will still respecting the maximum latency, or time-out, requirements of a protocol. A safety guard band in the space available for storing host data, control data, or both, is provided. If, on an access of the memory, it is determined that the guard band space is exceeded, the system uses a recovery back to the base state by triggering and prioritizing clean-up operations to re-establish all safety guard bands without breaking the timing requirements. To respect these timing requirements, the operations are split into portions and done in a phased manner during allowed latency periods.

41 Claims, 17 Drawing Sheets

U.S. PATENT DOCUMENTS

| | | | |
|---|---|---|---|
| 6,510,488 | B2 | 1/2003 | Lasser |
| 6,567,307 | B1 | 5/2003 | Estakhri |
| 6,657,891 | B1 | 12/2003 | Shibata et al. |
| 6,870,768 | B2 | 3/2005 | Cernea et al. |
| 7,057,339 | B2 | 6/2006 | Boroson et al. |
| 7,058,818 | B2 | 6/2006 | Dariel |
| 7,310,347 | B2 | 12/2007 | Lasser |
| 7,315,917 | B2 | 1/2008 | Bennett et al. |
| 7,426,623 | B2 | 9/2008 | Lasser |
| 7,444,461 | B2 | 10/2008 | Traister et al. |
| 7,464,216 | B2 | 12/2008 | Gorobets |
| 7,493,457 | B2 | 2/2009 | Murin |
| 7,502,254 | B2 | 3/2009 | Murin et al. |
| 2005/0144365 | A1 | 6/2005 | Gorobets et al. |
| 2005/0213393 | A1 | 9/2005 | Lasser |
| 2006/0004971 | A1* | 1/2006 | Kim et al. ............... 711/154 |
| 2007/0061502 | A1 | 3/2007 | Lasser |
| 2007/0065119 | A1 | 3/2007 | Pomerantz |
| 2007/0091677 | A1 | 4/2007 | Lasser et al. |
| 2007/0180346 | A1 | 8/2007 | Murin |
| 2007/0220197 | A1 | 9/2007 | Lasser |
| 2007/0260808 | A1 | 11/2007 | Raines et al. |
| 2007/0268745 | A1 | 11/2007 | Lasser |
| 2007/0283081 | A1 | 12/2007 | Lasser |
| 2008/0034175 | A1* | 2/2008 | Traister et al. ............ 711/159 |
| 2008/0104312 | A1 | 5/2008 | Lasser |
| 2008/0162612 | A1 | 7/2008 | Tomlin et al. |
| 2008/0181000 | A1 | 7/2008 | Lasser |
| 2008/0244338 | A1 | 10/2008 | Mokhlesi et al. |
| 2008/0244367 | A1 | 10/2008 | Chin et al. |
| 2008/0250300 | A1 | 10/2008 | Mokhlesi et al. |
| 2008/0307164 | A1* | 12/2008 | Sinclair ................. 711/135 |
| 2009/0037651 | A1* | 2/2009 | Gorobets ............... 711/103 |
| 2009/0089481 | A1 | 4/2009 | Kapoor et al. |
| 2009/0094482 | A1 | 4/2009 | Zilberman |
| 2010/0122016 | A1* | 5/2010 | Marotta et al. ............ 711/103 |
| 2010/0318719 | A1* | 12/2010 | Keays et al. ............. 711/103 |
| 2011/0107042 | A1* | 5/2011 | Herron .................. 711/161 |
| 2011/0107050 | A1* | 5/2011 | Vengerov ............... 711/170 |
| 2011/0153919 | A1* | 6/2011 | Sabbag .................. 711/103 |
| 2011/0252187 | A1* | 10/2011 | Segal et al. ............. 711/103 |

OTHER PUBLICATIONS

Rajan et al., "Two-Level Mapping Based Cache Index Selection for Packet Forwarding Engines," *Indian Institute of Science*, Sep. 2006, 10 pages.

Eitan et al., "NROM: A Novel Localized Trapping, 2-Bit Nonvolatile Memory Cell," *IEEE Electron Device Letters*, vol. 21, No. 11, Nov. 2000, pp. 543-545.

U.S. Appl. No. 12/348,819 entitled "Wear Leveling for Non-Volatile Memories: Maintenance of Experience Count and Passive Techniques," filed Jan. 5, 2009, 73 pages.

U.S. Appl. No. 12/348,825 entitled "Spare Block Management in Non-Volatile Memories," filed Jan. 5, 2009, 76 pages.

U.S. Appl. No. 12/348,895 entitled "Nonvolatile Memory With Write Cache Having Flush/Eviction Methods," filed Jan. 5, 2009, 151 pages.

U.S. Appl. No. 12/348,899 entitled "Non-Volatile Memory and Method With Write Cache Partition Management Methods," filed Jan. 5, 2009, 149 pages.

U.S. Appl. No. 12/348,891 entitled "Non-Volatile Memory and Method With Write Cache Partitioning," filed Jan. 5, 2009, 151 pages.

U.S. Appl. No. 61/142,620 entitled "Non-Volatile Memory and Method With Improved Block Management System," filed Jan. 5, 2009, 144 pages.

U.S. Appl. No. 12/642,584 entitled "Maintaining Updates of Multi-Level Non-Volatile Memory in Binary Non-Volatile Memory," filed Dec. 18, 2009, 76 pages.

U.S. Appl. No. 12/642,611 entitled "Non-Volatile Memory with Multi-Gear Control Using On-Chip Folding of Data," filed Dec. 18, 2009, 74 pages.

U.S. Appl. No. 12/642,649 entitled "Data Transfer Flows for On-Chip Folding," filed Dec. 18, 2009, 73 pages.

U.S. Appl. No. 12/642,728 entitled "Non-Volatile Memory and Method With Post-Write Read and Adaptive Re-Write to Manage Errors," filed Dec. 18, 2009, 70 pages.

U.S. Appl. No. 12/642,740 entitled "Non-Volatile Memory and Method With Atomic Program Sequence and Write Abort Detection," Filed Dec. 18, 2009, 60 pages.

U.S. Appl. No. 12/478,997 entitled "Folding Data Stored in Binary Format into Multi-State Format Within Non-Volatile Devices," Jun. 5, 2009, 52 pages.

U.S. Appl. No. 12/821,423, entitled Techniques of Maintaining Logical to Physical Mapping Information in Non-Volatile Memory Systems, filed Jun. 23, 2010, 66 pages.

\* cited by examiner

Programming into Four States Represented by a 2-bit Code

Lower Page Read (2-bit Code)

Upper Page Read (2-bit Code)

USE OF GUARD BANDS AND PHASED MAINTENANCE OPERATIONS TO AVOID EXCEEDING MAXIMUM LATENCY REQUIREMENTS IN NON-VOLATILE MEMORY SYSTEMS

BACKGROUND

This application relates to the operation of re-programmable non-volatile memory systems such as semiconductor flash memory, and, more specifically, to techniques for carrying out maintenance operations in non-volatile memory systems without exceeding the latency requirements of a host-memory system protocol.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

The transistor serving as a memory cell is typically programmed to a "programmed" state by one of two mechanisms. In "hot electron injection," a high voltage applied to the drain accelerates electrons across the substrate channel region. At the same time a high voltage applied to the control gate pulls the hot electrons through a thin gate dielectric onto the floating gate. In "tunneling injection," a high voltage is applied to the control gate relative to the substrate. In this way, electrons are pulled from the substrate to the intervening floating gate. While the term "program" has been used historically to describe writing to a memory by injecting electrons to an initially erased charge storage unit of the memory cell so as to alter the memory state, it has now been used interchangeable with more common terms such as "write" or "record."

The memory device may be erased by a number of mechanisms. For EEPROM, a memory cell is electrically erasable, by applying a high voltage to the substrate relative to the control gate so as to induce electrons in the floating gate to tunnel through a thin oxide to the substrate channel region (i.e., Fowler-Nordheim tunneling.) Typically, the EEPROM is erasable byte by byte. For flash EEPROM, the memory is electrically erasable either all at once or one or more minimum erasable blocks at a time, where a minimum erasable block may consist of one or more sectors and each sector may store 512 bytes or more of data.

The memory device typically comprises one or more memory chips that may be mounted on a card. Each memory chip comprises an array of memory cells supported by peripheral circuits such as decoders and erase, write and read circuits. The more sophisticated memory devices also come with a controller that performs intelligent and higher level memory operations and interfacing.

There are many commercially successful non-volatile solid-state memory devices being used today. These memory devices may be flash EEPROM or may employ other types of nonvolatile memory cells. Examples of flash memory and systems and methods of manufacturing them are given in U.S. Pat. Nos. 5,070,032, 5,095,344, 5,315,541, 5,343,063, and 5,661,053, 5,313,421 and 6,222,762. In particular, flash memory devices with NAND string structures are described in U.S. Pat. Nos. 5,570,315, 5,903,495, 6,046,935. Also non-volatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In order to improve read and program performance, multiple charge storage elements or memory transistors in an array are read or programmed in parallel. Thus, a "page" of memory elements are read or programmed together. In existing memory architectures, a row typically contains several interleaved pages or it may constitute one page. All memory elements of a page will be read or programmed together.

In flash memory systems, erase operation may take as much as an order of magnitude longer than read and program operations. Thus, it is desirable to have the erase block of substantial size. In this way, the erase time is amortized over a large aggregate of memory cells.

The nature of flash memory predicates that data must be written to an erased memory location. If data of a certain logical address from a host is to be updated, one way is rewrite the update data in the same physical memory location. That is, the logical to physical address mapping is unchanged. However, this will mean the entire erase block contain that physical location will have to be first erased and then rewritten with the updated data. This method of update is inefficient, as it requires an entire erase block to be erased and rewritten, especially if the data to be updated only occupies a small portion of the erase block. It will also result in a higher frequency of erase recycling of the memory block, which is undesirable in view of the limited endurance of this type of memory device.

Data communicated through external interfaces of host systems, memory systems and other electronic systems are addressed and mapped into the physical locations of a flash memory system. Typically, addresses of data files generated or received by the system are mapped into distinct ranges of a continuous logical address space established for the system in terms of logical blocks of data (hereinafter the "LBA interface"). The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In current commercial flash memory systems, the size of the erase unit has been increased to a block of enough memory cells to store multiple sectors of data. Indeed, many pages of data are stored in one block, and a page may store multiple sectors of data. Further, two or more blocks are often operated together as metablocks, and the pages of such blocks logically linked together as metapages. A page or metapage of data are written and read together, which can include many sectors of data, thus increasing the parallelism of the operation. Along with such large capacity operating units the challenge is to operate them efficiently.

For ease of explanation, unless otherwise specified, it is intended that the term "block" as used herein refer to either the block unit of erase or a multiple block "metablock," depending upon whether metablocks are being used in a specific system. Similarly, reference to a "page" herein may refer to a unit of programming within a single block or a "metapage" within a metablock, depending upon the system configuration.

When the currently prevalent LBA interface to the memory system is used, files generated by a host to which the memory is connected are assigned unique addresses within the logical address space of the interface. The memory system then commonly maps data between the logical address space and pages of the physical blocks of memory. The memory system keeps track of how the logical address space is mapped into the physical memory but the host is unaware of this. The host keeps track of the addresses of its data files within the logical address space but the memory system operates with little or no knowledge of this mapping.

Another problem with managing flash memory system has to do with system control and directory data. The data is produced and accessed during the course of various memory operations. Thus, its efficient handling and ready access will directly impact performance. It would be desirable to maintain this type of data in flash memory because flash memory is meant for storage and is nonvolatile. However, with an intervening file management system between the controller and the flash memory, the data can not be accessed as directly. Also, system control and directory data tends to be active and fragmented, which is not conducive to storing in a system with large size block erase. Conventionally, this type of data is set up in the controller RAM, thereby allowing direct access by the controller. After the memory device is powered up, a process of initialization enables the flash memory to be scanned in order to compile the necessary system control and directory information to be placed in the controller RAM. This process takes time and requires controller RAM capacity, all the more so with ever increasing flash memory capacity.

U.S. Pat. No. 6,567,307 discloses a method of dealing with sector updates among large erase block including recording the update data in multiple erase blocks acting as scratch pad and eventually consolidating the valid sectors among the various blocks and rewriting the sectors after rearranging them in logically sequential order. In this way, a block needs not be erased and rewritten at every slightest update.

WO 03/027828 and WO 00/49488 both disclose a memory system dealing with updates among large erase block including partitioning the logical sector addresses in zones. A small zone of logical address range is reserved for active system control data separate from another zone for user data. In this way, manipulation of the system control data in its own zone will not interact with the associated user data in another zone. Updates are at the logical sector level and a write pointer points to the corresponding physical sectors in a block to be written. The mapping information is buffered in RAM and eventually stored in a sector allocation table in the main memory. The latest version of a logical sector will obsolete all previous versions among existing blocks, which become partially obsolete. Garbage collection is performed to keep partially obsolete blocks to an acceptable number.

Prior art systems tend to have the update data distributed over many blocks or the update data may render many existing blocks partially obsolete. The result often is a large amount of garbage collection necessary for the partially obsolete blocks, which is inefficient and causes premature aging of the memory. Also, there is no systematic and efficient way of dealing with sequential update as compared to non-sequential update.

Flash memory with a block management system employing a mixture of sequential and chaotic update blocks is disclosed in United States Patent Publication No. US-2005-0144365-A1 dated Jun. 30, 2005, the entire disclosure of which is incorporated herein by reference.

Prior art has disclosed flash memory systems operating with a cache and operating in mixed MLC (multi-level cell) and SLC (single-level cell) modes and with the SLC memory operating as a dedicated cache. However, the cache disclosed is mainly to buffer the data between a fast host and a slower MLC memory and for accumulation to write to a block. These systems mostly treat the cache memory at a high level as storage and ignoring the underlying low level operating considerations of the block structure and its update scheme. The following publications are examples of these prior art.

Using RAM in a write cache operating with a flash memory has been disclosed in U.S. Pat. No. 5,936,971 to Harari et al.

Partitioning the memory into two portions one operating in binary and the other in MLC has been disclosed in U.S. Pat. No. 5,930,167 to Lee et al and U.S. Pat. No. 6,456,528 to Chen, the entire disclosure of which is incorporated therein by reference.

United States Patent Publication Number: Publication Number: US-2007-0061502-A1 on Mar. 15, 2007 and US-2007-0283081-A1 dated Dec. 6, 2007 by Lasser both disclose a flash memory operating in mixed MLC and SLC modes. A specific portion of the memory is always allocated to operate in SLC mode and to serve as a dedicated cache.

Therefore there is a general need for high capacity and high performance non-volatile memory. In particular, there is a need to have a high capacity nonvolatile memory able to conduct memory operations in large blocks without the aforementioned problems. Specifically, large block memories of these type typically require a number of garbage collections and other complex maintenance that are often difficult to perform under the time allotments of protocols having strict timeout requirements are strict, such as the SD (Secure Digital) protocol.

SUMMARY OF THE INVENTION

According to a general aspect of the invention, a method of operating a memory system is presented. The memory system includes a memory circuit having a memory circuit having an array of non-volatile memory cells and a controller circuit, where the controller oversees the transfer of user data between a host and the memory array and manages the storage of user data on the memory array. An interface of the controller receives a first host command for a write operation to the non-volatile memory. The logic circuitry of the controller determines whether the execution of the first host command will result in the amount of free space available in a first section of the non-volatile memory decreasing below a first level. The memory system subsequently executes the first host command. In response to determining that the execution of the first host command will result in the amount of free space available in the first section decreasing below the first level, while executing the first host command the memory also performs at least a portion of a maintenance operation to increase the amount of free space available in the first section, where the portion of the maintenance operation performed is based on the amount of time available during the first host command without exceeding a maximum latency.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Memory System

FIG. 1 to FIG. 7 provide example memory systems in which the various aspects of the present invention may be implemented or illustrated.

FIG. 8 to FIG. 14 illustrate one memory and block architecture for implementing the various aspects of the present invention.

Figure 1:
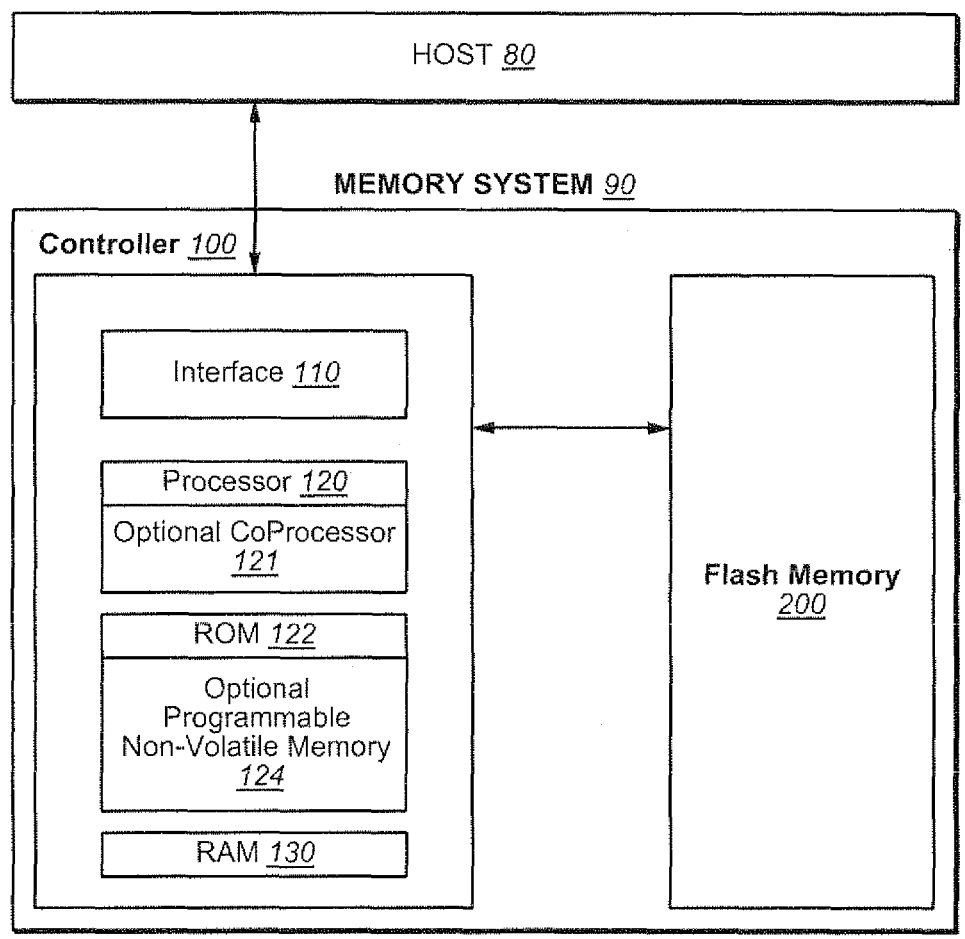
FIG. 1 illustrates schematically the main hardware components of a memory system suitable for implementing the present invention.

FIG. 1 illustrates schematically the main hardware components of a memory system suitable for implementing the present invention. The memory system 90 typically operates with a host 80 through a host interface. The memory system is typically in the form of a memory card or an embedded memory system. The memory system 90 includes a memory 200 whose operations are controlled by a controller 100. The memory 200 comprises of one or more array of non-volatile memory cells distributed over one or more integrated circuit chip. The controller 100 includes an interface 110, a processor 120, an optional coprocessor 121, ROM 122 (read-only-memory), RAM 130 (random access memory) and optionally programmable nonvolatile memory 124. The interface 110 has one component interfacing the controller to a host and another component interfacing to the memory 200. Firmware stored in nonvolatile ROM 122 and/or the optional nonvolatile memory 124 provides codes for the processor 120 to implement the functions of the controller 100. Error correction codes may be processed by the processor 120 or the optional coprocessor 121. In an alternative embodiment, the controller 100 is implemented by a state machine (not shown.) In yet another embodiment, the controller 100 is implemented within the host.

Physical Memory Structure

Figure 2:
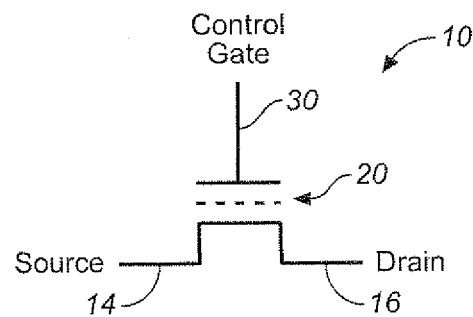
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a dielectric layer. The memory cell 10 also includes a source 14, a drain 16, and a control gate 30.

There are many commercially successful non-volatile solid-state memory devices being used today. These memory devices may employ different types of memory cells, each type having one or more charge storage element.

Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661,053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545, and in U.S. Pat. Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current. In one implementation the detection of the conduction current relative to a threshold current is accomplished by examining the rate the conduction current is discharging through the capacitance of the bit line.

Figure 3:
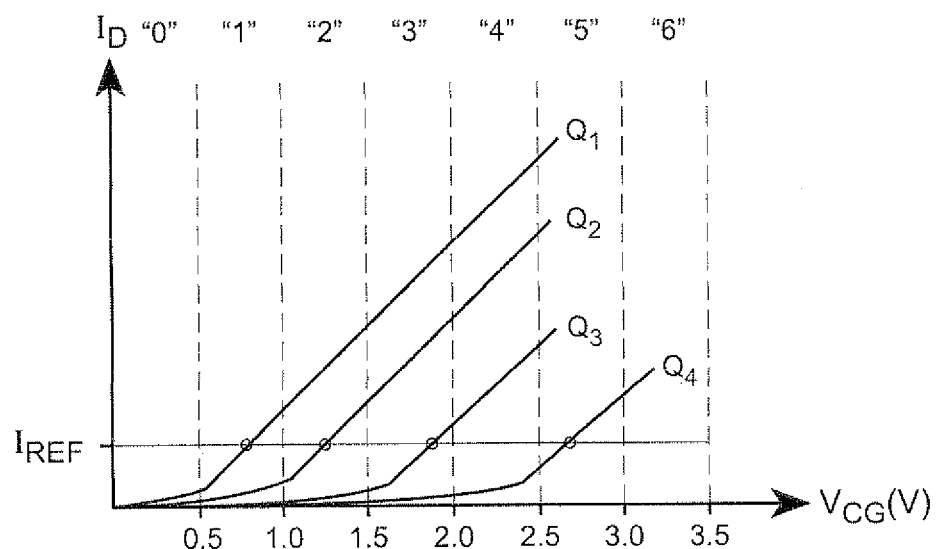
FIG. 3 illustrates the relation between the source-drain current $I_D$ and the control gate voltage $V_{CG}$ for four different charges Q1-Q4 that the floating gate may be selectively storing at any one time.

FIG. 3 illustrates the relation between the source-drain current $I_D$ and the control gate voltage $V_{CG}$ for four different charges Q1-Q4 that the floating gate may be selectively storing at any one time. The four solid $I_D$ versus $V_{CG}$ curves represent four possible charge levels that can be programmed on a floating gate of a memory cell, respectively corresponding to four possible memory states. As an example, the threshold voltage window of a population of cells may range from 0.5V to 3.5V. Seven possible memory states "0", "1", "2", "3", "4", "5", "6", respectively representing one erased and six programmed states may be demarcated by partitioning the threshold window into five regions in interval of 0.5V each. For example, if a reference current, IREF of 2 µA is used as shown, then the cell programmed with Q1 may be considered to be in a memory state "1" since its curve intersects with $I_{REF}$ in the region of the threshold window demarcated by VCG=0.5V and 1.0V. Similarly, Q4 is in a memory state "5".

As can be seen from the description above, the more states a memory cell is made to store, the more finely divided is its threshold window. For example, a memory device may have memory cells having a threshold window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

Figure 4A:
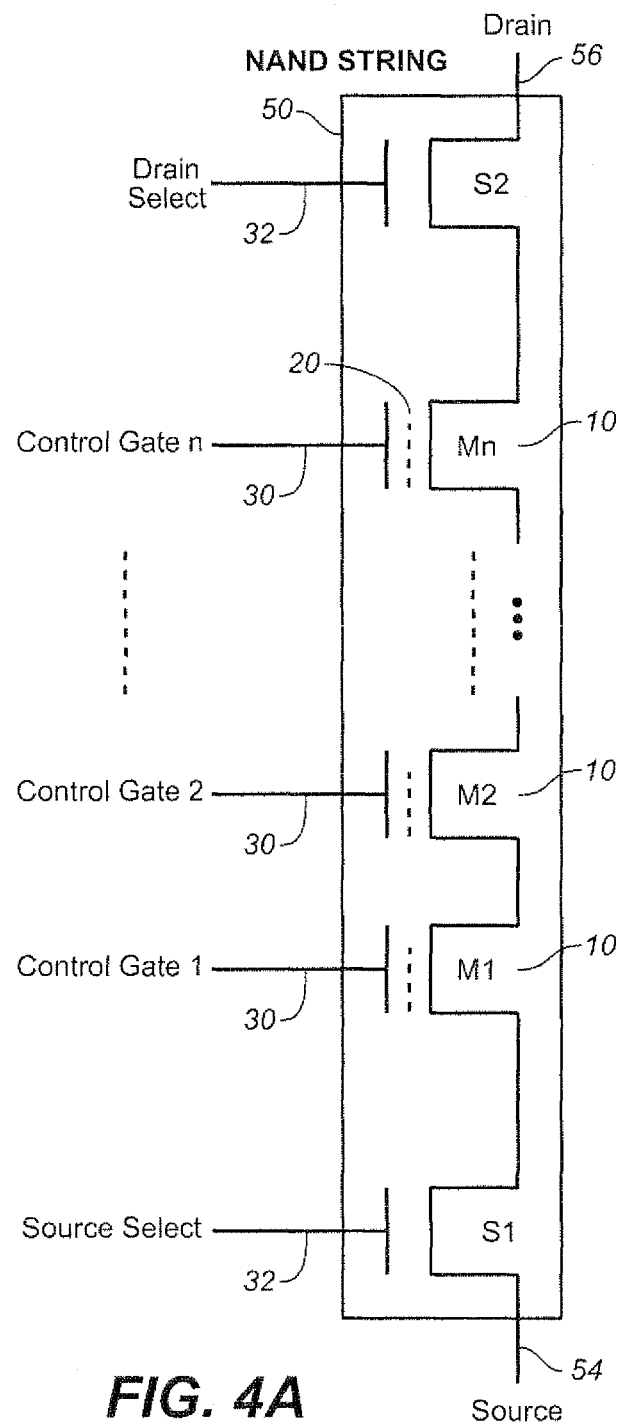
FIG. 4A illustrates schematically a string of memory cells organized into an NAND string.

FIG. 4A illustrates schematically a string of memory cells organized into an NAND string. An NAND string 50 comprises of a series of memory transistors M1, M2, . . . Mn (e.g., n=4, 8, 16 or higher) daisy-chained by their sources and drains. A pair of select transistors S1, S2 controls the memory transistors chain's connection to the external via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gates 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within an NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effective created from the source of the individual memory transistor to the source terminal 54 of the NAND string and likewise for the drain of the individual memory transistor to the drain terminal 56 of the cell. Memory devices with such NAND string structures are described in U.S. Pat. Nos. 5,570,315, 5,903,495, 6,046,935.

Figure 4B:
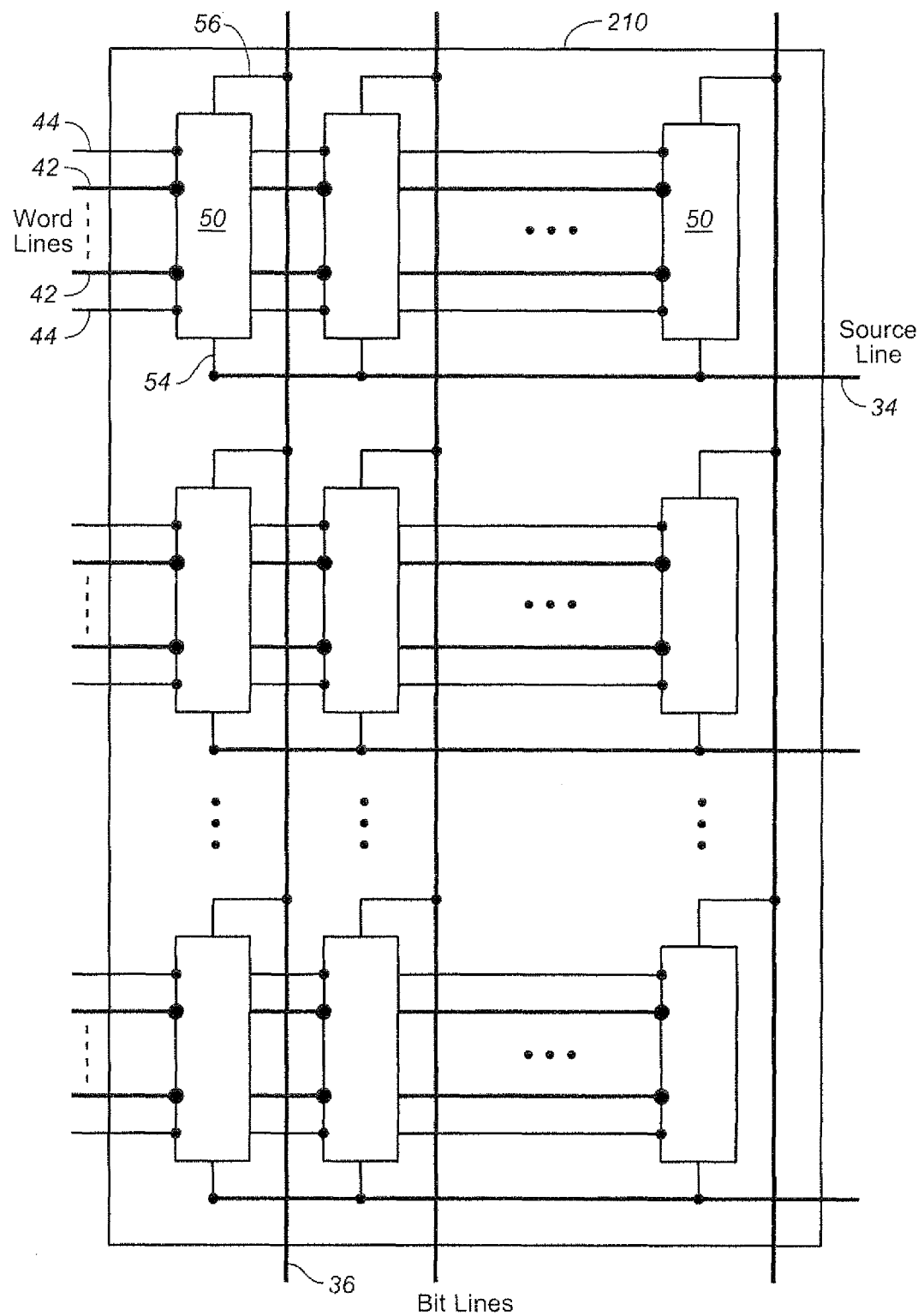
FIG. 4B illustrates an example of an NAND array 210 of memory cells, constituted from NAND strings 50 such as that shown in FIG. 4A.

FIG. 4B illustrates an example of an NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is couple to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings. When a memory transistor within a NAND string is being read, the remaining memory transistors in the string are turned on hard via their associated word lines so that the current flowing through the string is essentially dependent upon the level of charge stored in the cell being read.

Figure 5:
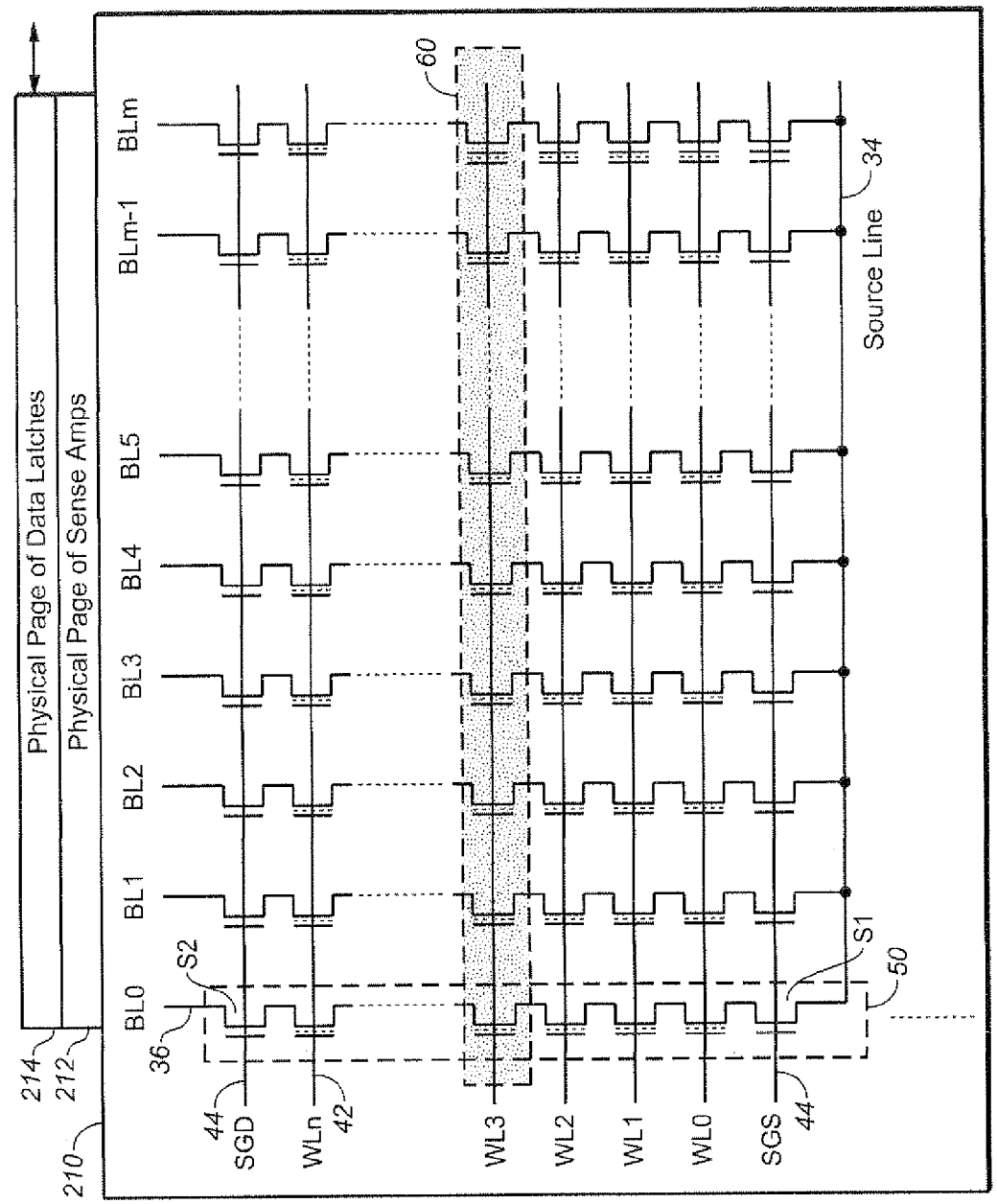
FIG. 5 illustrates a page of memory cells, organized for example in the NAND configuration, being sensed or programmed in parallel.

FIG. 5 illustrates a page of memory cells, organized for example in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A "page" such as the page 60, is a group of memory cells enabled to be sensed or programmed in parallel. This is accomplished by a corresponding page of sense amplifiers 212. The sensed results are latches in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One important difference between flash memory and of type of memory is that a cell must be programmed from the erased state. That is the floating gate must first be emptied of charge. Programming then adds a desired amount of charge back to the floating gate. It does not support removing a portion of the charge from the floating to go from a more programmed state to a lesser one. This means that update data cannot overwrite existing one and must be written to a previous unwritten location.

Furthermore erasing is to empty all the charges from the floating gate and generally takes appreciably time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data. Just before the block is erased, a garbage collection is required to salvage the non-obsolete data in the block.

Each block is typically divided into a number of pages. A page is a unit of programming Or reading. In one embodiment, the individual pages may be divided into segments and the segments may contain the fewest number of cells that are written at one time as a basic programming operation. One or more pages of data are typically stored in one row of memory cells. A page can store one or more sectors. A sector includes user data and overhead data. Multiple blocks and pages distributed across multiple arrays can also be operated together as metablocks and metapages. If they are distributed over multiple chips, they can be operated together as megablocks and megapage.

Examples of Multi-Level Cell ("MLC") Memory Partitioning

A nonvolatile memory in which the memory cells each stores multiple bits of data has already been described in connection with FIG. 3. A particular example is a memory formed from an array of field-effect transistors, each having a charge storage layer between its channel region and its control gate. The charge storage layer or unit can store a range of charges, giving rise to a range of threshold voltages for each field-effect transistor. The range of possible threshold voltages spans a threshold window. When the threshold window is partitioned into multiple sub-ranges or zones of threshold voltages, each resolvable zone is used to represent a different memory states for a memory cell. The multiple memory states can be coded by one or more binary bits. For example, a memory cell partitioned into four zones can support four states which can be coded as 2-bit data. Similarly, a memory cell partitioned into eight zones can support eight memory states which can be coded as 3-bit data, etc.

All-Bit, Full-Sequence MLC Programming

Figure 6:
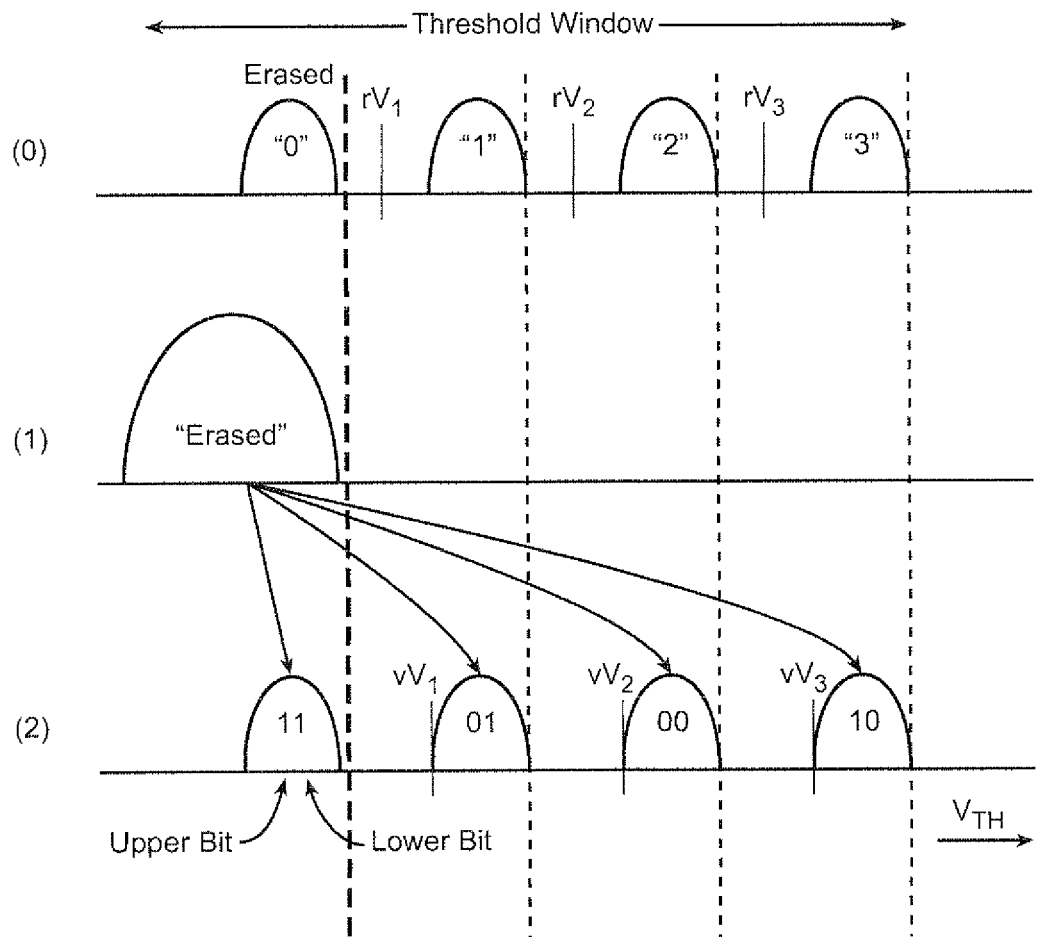
FIGS. 6(0)-6(2) illustrate an example of programming a population of 4-state memory cells.

FIGS. 6(0)-6(2) illustrate an example of programming a population of 4-state memory cells. FIG. 6(0) illustrates the population of memory cells programmable into four distinct distributions of threshold voltages respectively representing memory states "0", "1", "2" and "3". FIG. 6(1) illustrates the initial distribution of "erased" threshold voltages for an erased memory. FIG. 6(2) illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed state "1", "2" and "3" or remain un-programmed in the "erased" state. As the memory gets more programming, the initial distribution of the "erased" state as shown in FIG. 6(1) will become narrower and the erased state is represented by the "0" state.

A 2-bit code having a lower bit and an upper bit can be used to represent each of the four memory states. For example, the "0", "1", "2" and "3" states are respectively represented by "11", "01", "00" and "10". The 2-bit data may be read from the memory by sensing in "full-sequence" mode where the two bits are sensed together by sensing relative to the read demarcation threshold values $rV_1$, $rV_2$ and $rV_3$ in three sub-passes respectively.

Bit-by-Bit MLC Programming and Reading

Figure 7A:
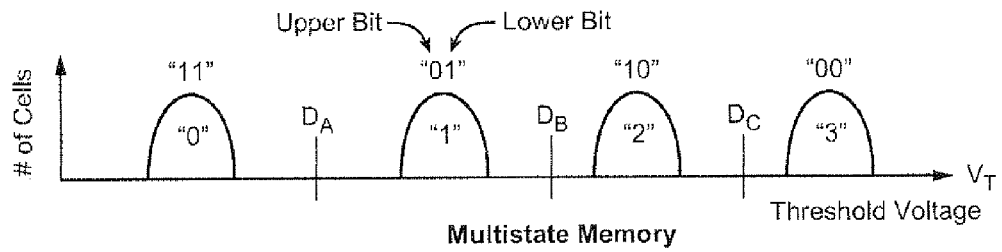
FIGS. 7A-7E illustrate the programming and reading of the 4-state memory encoded with a given 2-bit code.

FIGS. 7A-7E illustrate the programming and reading of the 4-state memory encoded with a given 2-bit code. FIG. 7A illustrates threshold voltage distributions of the 4-state memory array when each memory cell stores two bits of data using the 2-bit code. Such a 2-bit code has been disclosed in U.S. patent application Ser. No. 10/830,824 filed Apr. 24, 2004 by Li et al., entitled "NON-VOLATILE MEMORY AND CONTROL WITH IMPROVED PARTIAL PAGE PROGRAM CAPABILITY".

Figure 7B:
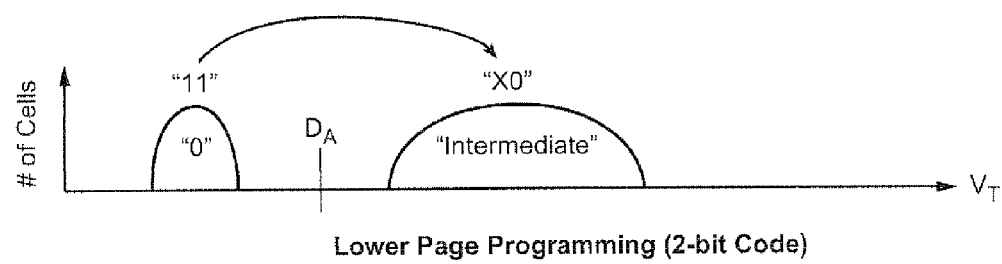

FIG. 7B illustrates the lower page programming (lower bit) in a 2-pass programming scheme using the 2-bit code. The fault-tolerant LM New code essentially avoids any upper page programming to transit through any intermediate states. Thus, the first pass lower page programming has the logical state (upper bit, lower bit)=(1, 1) transits to some intermediate state (x, 0) as represented by programming the "unprogrammed" memory state "0" to the "intermediate" state designated by (x, 0) with a programmed threshold voltage greater than $D_A$ but less than $D_C$.

Figure 7C:
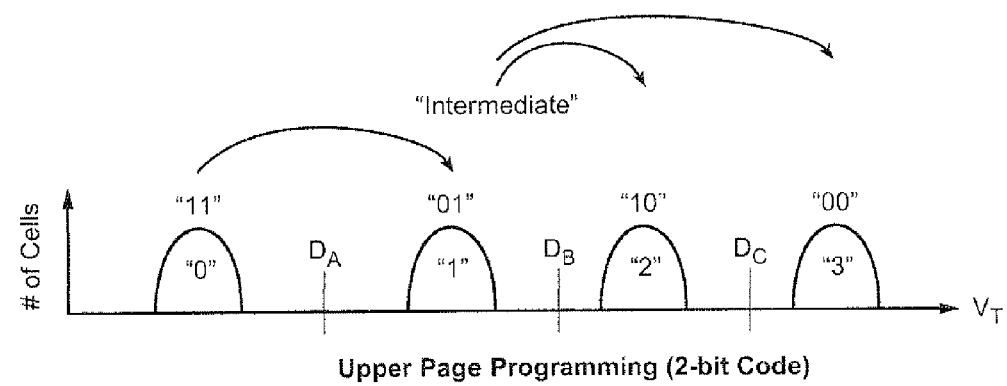

FIG. 7C illustrates the upper page programming (upper bit) in the 2-pass programming scheme using the 2-bit code. In the second pass of programming the upper page bit to "0", if the lower page bit is at "1", the logical state (1, 1) transits to (0, 1) as represented by programming the "unprogrammed" memory state "0" to "1". If the lower page bit is at "0", the logical state (0, 0) is obtained by programming from the "intermediate" state to "3". Similarly, if the upper page is to remain at "1", while the lower page has been programmed to "0", it will require a transition from the "intermediate" state to (1, 0) as represented by programming the "intermediate" state to "2".

Figure 7D:
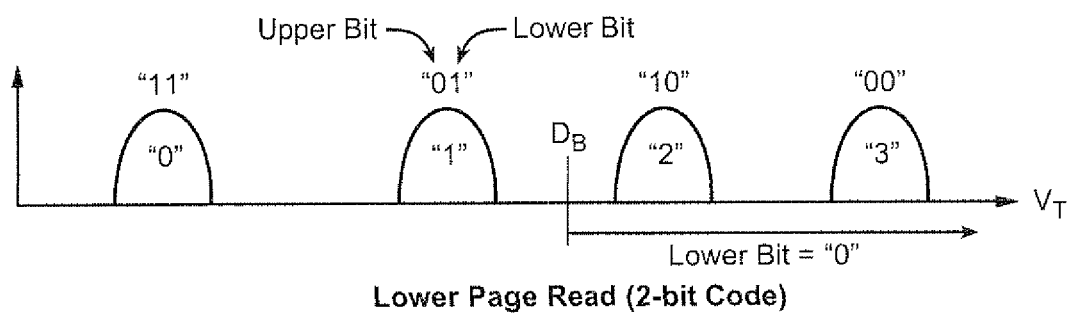

FIG. 7D illustrates the read operation that is required to discern the lower bit of the 4-state memory encoded with the 2-bit code. A readB operation is first performed to determine if the LM flag can be read. If so, the upper page has been programmed and the readB operation will yield the lower page data correctly. On the other hand, if the upper page has not yet been programmed, the lower page data will be read by a readA operation.

Figure 7E:
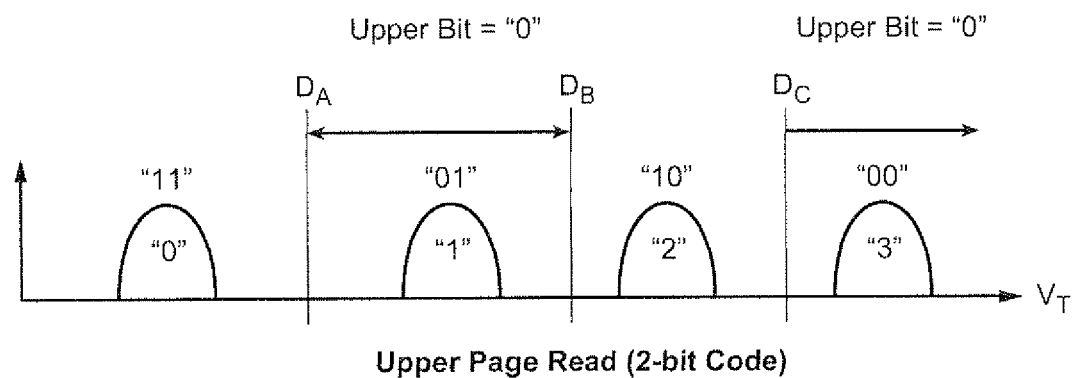

FIG. 7E illustrates the read operation that is required to discern the upper bit of the 4-state memory encoded with the 2-bit code. As is clear from the figure, the upper page read will require a 3-pass read of readA, readB and readC, respectively relative to the demarcation threshold voltages $D_A$, $D_B$ and $D_C$.

In the bit-by-bit scheme for a 2-bit memory, a physical page of memory cells will store two logical data pages, a lower data page corresponding to the lower bit and an upper data page corresponding to the upper bit.

Foggy-Fine Programming

Figure 7F:
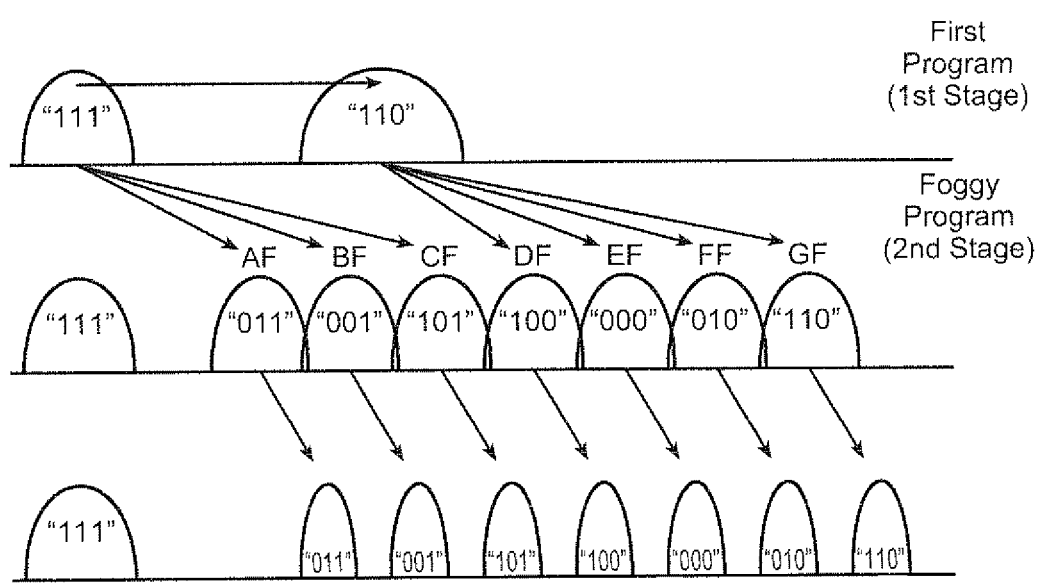
FIG. 7F illustrates a foggy-fine programming for an 8-state memory encoded with a given 3-bit code.

Another variation on multi-state programming employs a foggy-fine algorithm, as is illustrated in FIG. 7F for a 3-bit memory example. As shown there, this another multi-phase programming operation. A first programming operation is performed as shown in the top line, followed the foggy programming stage. The foggy phase is a full 3-bit programming operation from the first phase using all eight of the final states. At the end of the foggy, though, the data in these states is not yet fully resolved into well defined distributions for each of the 8 states (hence, the "foggy" name) and is not readily extractable.

As each cell is, however, programmed to near its eventual target state, the sort of neighboring cell to cell couplings, or "Yupin" effect, described in U.S. Pat. No. 6,870,768 are presenting most of their effect. Because of this, when the fine program phase (shown on the bottom line) is executed, these couplings have largely been factored in to this final phase so the cell distributions are more accurately resolved to their target ranges. More detail on these subjects is given in U.S. Pat. Nos. 6,870,768 and 6,657,891 and in the US patent application entitled "Atomic Program Sequence and Write Abort Detection" by Gorobets et al. having Ser. No. 12/642, 740 and which is being filed concurrently herewith, and which presents a "diagonal" first-foggy-fine method.

Binary and MLC Memory Partitioning

FIG. 6 and FIG. 7 illustrate examples of a 2-bit (also referred to as "D2") memory. As can be seen, a D2 memory has its threshold range or window partitioned into 4 regions, designating 4 states. Similarly, in D3, each cell stores 3 bits (low, middle and upper bits) and there are 8 regions. In D4, there are 4 bits and 16 regions, etc. As the memory's finite threshold window is partitioned into more regions, the resolution and for programming and reading will necessarily become finer. Two issues arise as the memory cell is configured to store more bits.

First, programming or reading will be slower when the threshold of a cell must be more accurately programmed or read. In fact in practice the sensing time (needed in programming and reading) tends to increase as the square of the number of partitioning levels.

Secondly, flash memory has an endurance problem as it ages with use. When a cell is repeatedly programmed and erased, charges is shuttled in and out of the floating gate 20 (see FIG. 2) by tunneling across a dielectric. Each time some charges may become trapped in the dielectric and will modify the threshold of the cell. In fact over use, the threshold window will progressively narrow. Thus, MLC memory generally is designed with tradeoffs between capacity, performance and reliability.

Conversely, it will be seen for a binary memory, the memory's threshold window is only partitioned into two regions. This will allow a maximum margin of errors. Thus, binary partitioning while diminished in storage capacity will provide maximum performance and reliability.

The multi-pass, bit-by-bit programming and reading technique described in connection with FIG. 7 provides a smooth transition between MLC and binary partitioning. In this case, if the memory is programmed with only the lower bit, it is effectively a binary partitioned memory. While this approach does not fully optimize the range of the threshold window as in the case of a single-level cell ("SLC") memory, it has the advantage of using the same demarcation or sensing level as in the operations of the lower bit of the MLC memory. As will be described later, this approach allows a MLC memory to be "expropriated" for use as a binary memory, or vice versa. How it should be understood that MLC memory tends to have more stringent specification for usage.

Binary Memory and Partial Page Programming

The charge programmed into the charge storage element of one memory cell produces an electric field that perturbs the electric field of a neighboring memory cell. This will affect the characteristics of the neighboring memory cell which essentially is a field-effect transistor with a charge storage element. In particular, when sensed the memory cell will appear to have a higher threshold level (or more programmed) than when it is less perturbed.

In general, if a memory cell is program-verified under a first field environment and later is read again under a different field environment due to neighboring cells subsequently being programmed with different charges, the read accuracy may be affected due to coupling between neighboring floating gates in what is referred to as the "Yupin Effect". With ever higher integration in semiconductor memories, the perturbation of the electric field due to the stored charges between memory cells (Yupin effect) becomes increasing appreciable as the inter-cellular spacing shrinks.

The Bit-by-Bit MLC Programming technique described in connection with FIG. 7 above is designed to minimize program disturb from cells along the same word line. As can be seen from FIG. 7B, in a first of the two programming passes, the thresholds of the cells are moved at most half way up the threshold window. The effect of the first pass is overtaken by the final pass. In the final pass, the thresholds are only moved a quarter of the way. In other words, for D2, the charge difference among neighboring cells is limited to a quarter of its maximum. For D3, with three passes, the final pass will limit the charge difference to one-eighth of its maximum.

However, the bit-by-bit multi-pass programming technique will be compromised by partial-page programming. A page is a group of memory cells, typically along a row or word line, that is programmed together as a unit. It is possible to program non overlapping portions of a page individually over multiple programming passes. However, owning to not all the cells of the page are programmed in a final pass together, it could create large difference in charges programmed among the cells after the page is done. Thus partial-page programming would result in more program disturb and would require a larger margin for sensing accuracy.

In the case the memory is configured as binary memory, the margin of operation is wider than that of MLC. In the preferred embodiment, the binary memory is configured to support partial-page programming in which non-overlapping portions of a page may be programmed individually in one of the multiple programming passes on the page. The programming and reading performance can be improved by operating with a page of large size. However, when the page size is much larger than the host's unit of write (typically a 512-byte sector), its usage will be inefficient. Operating with finer granularity than a page allows more efficient usage of such a page.

The example given has been between binary versus MLC. It should be understood that in general the same principles apply between a first memory with a first number of levels and a second memory with a second number of levels more than the first memory.

Logical and Physical Block Structures

Figure 8:
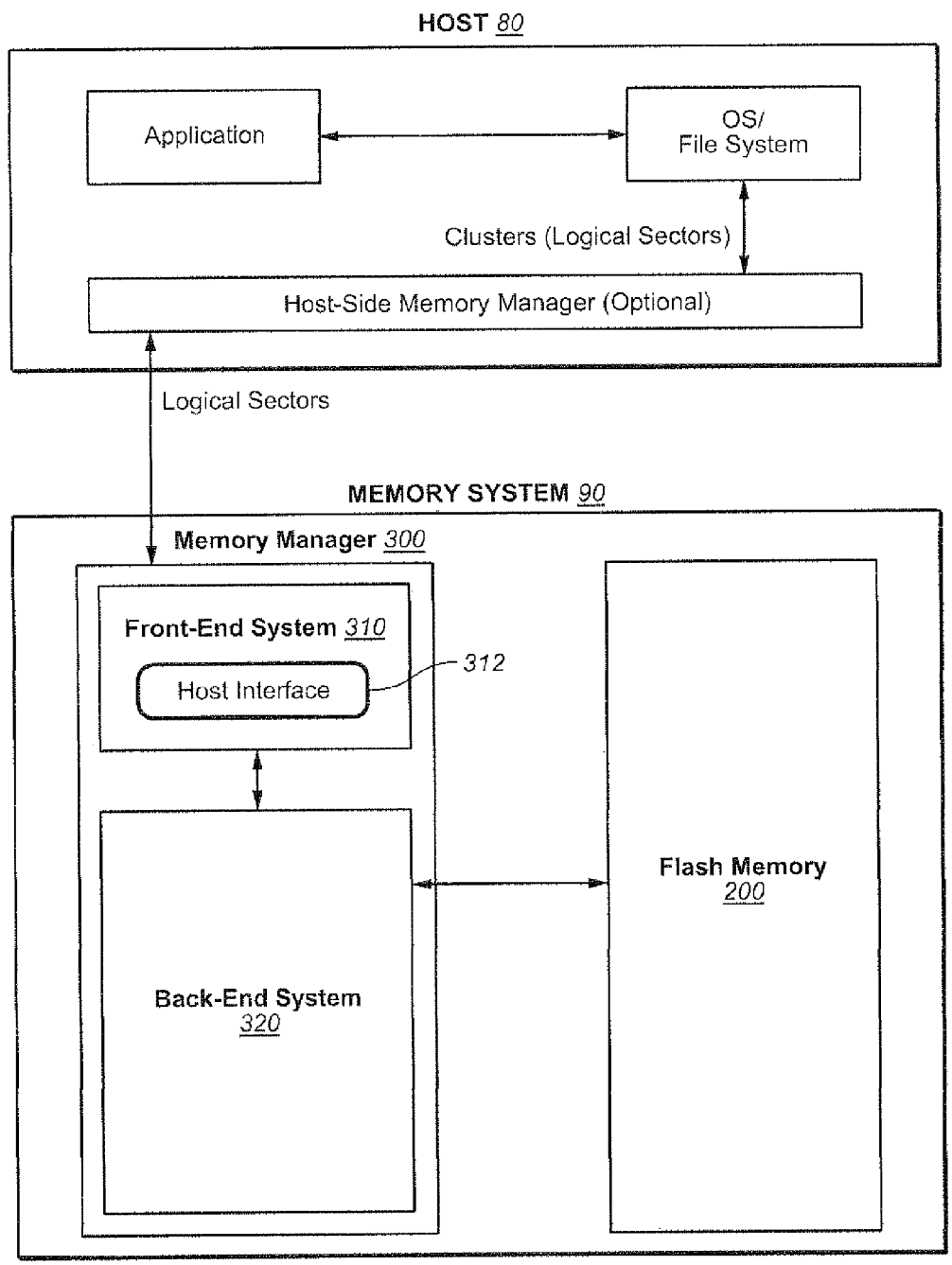
FIG. 8 illustrates the memory being managed by a memory manager with is a software component that resides in the controller.

FIG. 8 illustrates the memory being managed by a memory manager with is a software component that resides in the controller. The memory 200 is organized into blocks, each block of cells being a minimum unit of erase. Depending on implementation, the memory system may operate with even large units of erase formed by an aggregate of blocks into "metablocks" and also "megablocks". For convenience the description will refer to a unit of erase as a metablock although it will be understood that some systems operate with even larger unit of erase such as a "megablock" formed by an aggregate of metablocks.

The host 80 accesses the memory 200 when running an application under a file system or operating system. Typically, the host system addresses data in units of logical sectors where, for example, each sector may contain 512 bytes of data. Also, it is usual for the host to read or write to the memory system in unit of logical clusters, each consisting of one or more logical sectors. In some host systems, an optional host-side memory manager may exist to perform lower level memory management at the host. In most cases during read or write operations, the host 80 essentially issues a command to the memory system 90 to read or write a segment containing a string of logical sectors of data with contiguous addresses.

A memory-side memory manager 300 is implemented in the controller 100 of the memory system 90 to manage the storage and retrieval of the data of host logical sectors among metablocks of the flash memory 200. The memory manager comprises a front-end system 310 and a back-end system 320. The front-end system 310 includes a host interface 312. The back-end system 320 includes a number of software modules for managing erase, read and write operations of the metablocks. The memory manager also maintains system control data and directory data associated with its operations among the flash memory 200 and the controller RAM 130.

Figure 9:
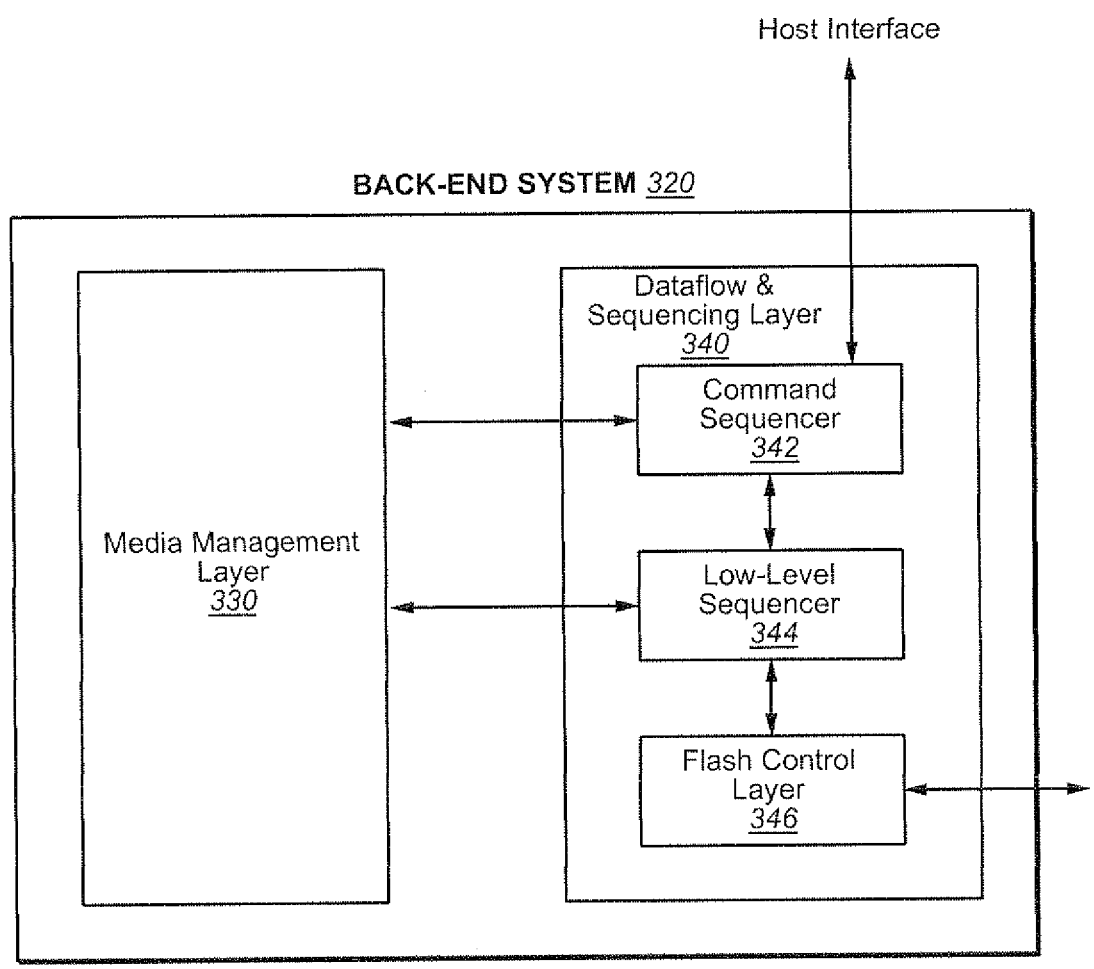
FIG. 9 illustrates the software modules of the back-end system.

FIG. 9 illustrates the software modules of the back-end system. The Back-End System mainly comprises two functional modules: a Media Management Layer 330 and a Dataflow and Sequencing Layer 340.

The media management layer 330 is responsible for the organization of logical data storage within a flash memory meta-block structure. More details will be provided later in the section on "Media management Layer".

The dataflow and sequencing layer 340 is responsible for the sequencing and transfer of sectors of data between a front-end system and a flash memory. This layer includes a command sequencer 342, a low-level sequencer 344 and a flash Control layer 346. More details will be provided later in the section on "Low Level System Spec".

The memory manager 300 is preferably implemented in the controller 100. It translates logical addresses received from the host into physical addresses within the memory array, where the data are actually stored, and then keeps track of these address translations.

Figure 10A:
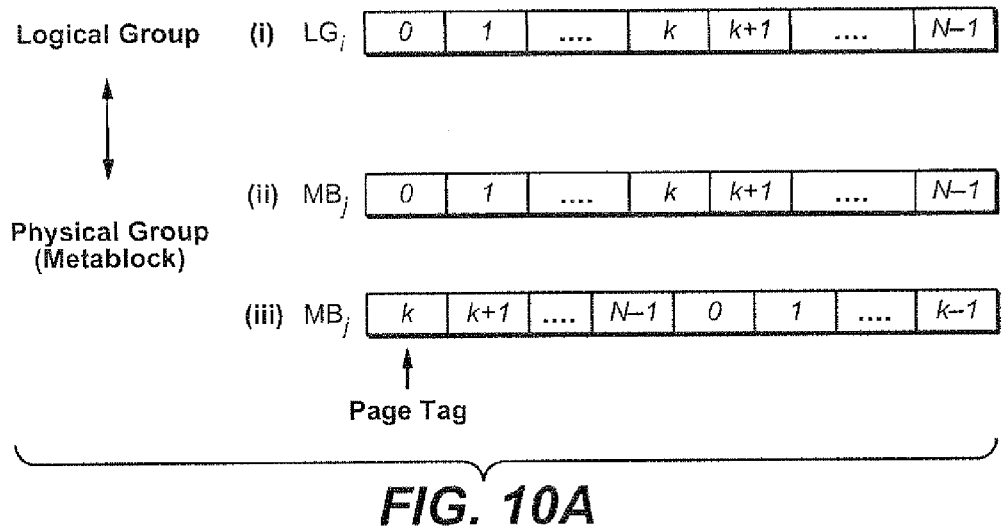
FIGS. 10A(i)-10A(iii) illustrate schematically the mapping between a logical group and a metablock.

FIGS. 10A(i)-10A(iii) illustrate schematically the mapping between a logical group and a metablock. The metablock of the physical memory has N physical sectors for storing N logical sectors of data of a logical group. FIG. 10A(i) shows the data from a logical group $LG_i$, where the logical sectors are in contiguous logical order 0, 1, . . . , N−1. FIG. 10A(ii) shows the same data being stored in the metablock in the same logical order. The metablock when stored in this manner is said to be "sequential." In general, the metablock may have data stored in a different order, in which case the metablock is said to be "non-sequential" or "chaotic."

There may be an offset between the lowest address of a logical group and the lowest address of the metablock to which it is mapped. In this case, logical sector address wraps round as a loop from bottom back to top of the logical group within the metablock. For example, in FIG. 10A(iii), the metablock stores in its first location beginning with the data of logical sector k. When the last logical sector N−1 is reached, it wraps around to sector 0 and finally storing data associated with logical sector k−1 in its last physical sector. In the preferred embodiment, a page tag is used to identify any offset, such as identifying the starting logical sector address of the data stored in the first physical sector of the metablock. Two blocks will be considered to have their logical sectors stored in similar order when they only differ by a page tag.

Figure 10B:
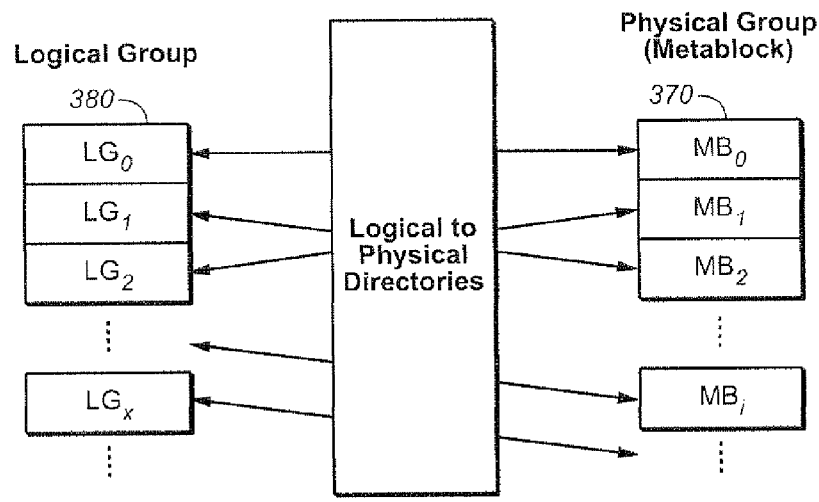
FIG. 10B illustrates schematically the mapping between logical groups and metablocks.

FIG. 10B illustrates schematically the mapping between logical groups and metablocks. Each logical group 380 is mapped to a unique metablock 370, except for a small number of logical groups in which data is currently being updated. After a logical group has been updated, it may be mapped to a different metablock. The mapping information is maintained in a set of logical to physical directories, which will be described in more detail later.

Memories Having Multi-Level and Binary Portions

Memory Partitioned into Main and Binary Cache Portions

A number of memory system arrangements where the non-volatile memory includes both binary and multi-level sections will now be described. In a first of these, in a flash memory having an array of memory cells that are organized into a plurality of blocks, the cells in each block being erased together, the flash memory is partitioned into at least two portions. A first portion forms the main memory for storing mainly user data. Individual memory cells in the main memory being configured to store one or more bits of data in each cell. A second portion forms a cache for data to be written to the main memory. The memory cells in the cache portion are configured to store less bits of data in each cell than that of the main memory. Both the cache portion and the main memory portion operate under a block management system for which cache operation is optimized. A more detailed presentation of this material is developed in the following U.S. patent application or provisional application Nos: Ser. Nos. 12/348,819; 12/348,825; 12/348,891; 12/348,895; 12/348,899; and 61/142,620, all filed on Jan. 5, 2009; and Ser. Nos. 12/642,584; 12/642,611; 12/642,649; 12/642,728; and 12/642,740, all filed on Dec. 18, 2009.

In the preferred embodiment, individual cells in the cache portion are each configured to store one bit of data while the cells in the main memory portion each stores more than one bit of data. The cache portion then operates as a binary cache with faster and more robust write and read performances.

In the preferred embodiment, the cache portion is configured to allow finer granularity of writes than that for the main memory portion. The finer granularity is more compatible with the granularity of logical data units from a host write. Due to requirement to store sequentially the logical data units in the blocks of the main memory, smaller and chaotic fragments of logical units from a series of host writes can be buffered in the cache portion and later reassembly in sequential order to the blocks in the main memory portion.

In one aspect of the invention, the decision for the block management system to write data directly to the main portion or to the cache portion depends on a number of predefined conditions. The predefined conditions include the attributes and characteristics of the data to be written, the state of the blocks in the main memory portion and the state of the blocks in the cache portion.

The Binary Cache of the present system has the follows features and advantages: a) it increases burst write speed to the device; b) it allows data that is not aligned to pages or meta-pages to be efficiently written; c) it accumulates data for a logical group, to minimize the amount of data that must be relocated during garbage collection of a meta-block after the data has been archived to the meta-block; d) it stores data for a logical group in which frequent repeated writes occur, to avoid writing data for this logical group to the meta-block; and e) it buffers host data, to allow garbage collection of the meta-block to be distributed amongst multiple host busy periods.

Figure 11:
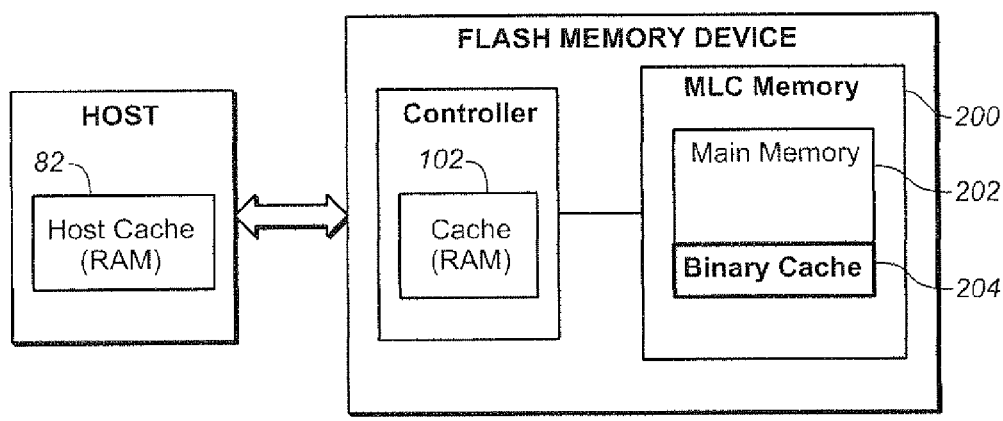
FIG. 11 illustrates a host operating with the flash memory device through a series of caches at different levels of the system.

FIG. 11 illustrates a host operating with the flash memory device through a series of caches at different levels of the system. A Cache is high-speed storage for temporarily storing data being passed between a high-speed and a slower-speed component of the system. Typically high-speed volatile RAM are employed as cache as in a host cache 82 and/or in a controller cache 102 of the memory controller. The non-volatile memory 200 is partitioned into two portions. The first portion 202 has the memory cells operating as a main memory for user data in either MLC or binary mode. The second portion 204 has the memory cells operating as a cache in a binary mode. Thus, the memory 200 is partitioned into a main memory 202 and a binary cache.

On-Memory Folding of Data into Multi-State Format

The various sorts of non-volatile memories described above can be operated in both binary forms and multi-state (or multi-level) forms. Some memory systems store data in both binary and multi-state formats; for example, as data can typically be written more quickly and with less critical tolerances in binary form, a memory may initial write data in binary form as it is received from a host and later rewrite this data in a multi-state format for greater storage density. In such memories, some cells may be used in binary format with others used in multi-state format, or the same cells may be operated to store differing numbers of bits. Examples of such systems are discussed in more detail in U.S. Pat. No. 6,456,528; US patent publication number 2009/0089481; and the following U.S. patent application Nos. 61/142,620; Ser. Nos. 12/348,819; 12/348,825; 12/348,891; 12/348,895; 12/348,899; 12/642,584; 12/642,611; U.S. Ser. Nos. 12/642,649; 12/642,728; and 12/642,740. The techniques described in this section relate to rewriting data from a binary format into a multi-state format in a "folding" process executed on the memory device itself, without the requirement of transferring the data back to the controller for reformatting. The on-memory folding process can also be used in a special way to manage error correction code (ECC) where the relative state of the data in the memory cell, when stored in multi-state form, is taken into account when considering that the most probable errors are transitions between the neighboring states. (So called "Strong ECC" or "SECC", where additional background detail on these subjects can be found in the following US patents, patent publications, and patent application numbers: 2009/0094482; U.S. Pat. No. 7,502,254; 2007/0268745; 2007/0283081; U.S. Pat. No. 7,310,347; U.S. Pat. No. 7,493,457; U.S. Pat. No. 7,426, 623; 2007/0220197; 2007/0065119; 2007/0061502; 2007/0091677; 2007/0180346; 2008/0181000; 2007/0260808; 2005/0213393; U.S. Pat. No. 6,510,488; U.S. Pat. No. 7,058,818; 2008/0244338; 2008/0244367; 2008/0250300; and 2008/0104312.) The system can also use ECC management which does not consider state information and manages ECC based on single page information.

More specifically, in one exemplary embodiment, as data is transferred from the controller to the memory, it is written along word lines of the memory array in a binary format. Subsequently, the data is then read into the registers associated with the array, where it is rearranged so that it can be written back into array in a multi-state form. To take the case of three bits per cell, for example, the content of three word lines would be each be read into the register structures, rearranged to correspond to the three bits that would be stored in each cell, and then rewritten back to a single word line of the array in a 3-bit per cell format. In the arrangement described here, the binary data content of a single word line is then end up on 1/Nth of a word line store in an N-bit per cell format. For cases where the eventual N-bit storage of the data uses an error correction code (ECC) that exploits the relation of the multi-states with a cell, this ECC can be determined in the controller and transferred along with the corresponding data and stored in the binary format prior to the data (and corresponding ECC) being rewritten in the multi-state format.

Figure 12:
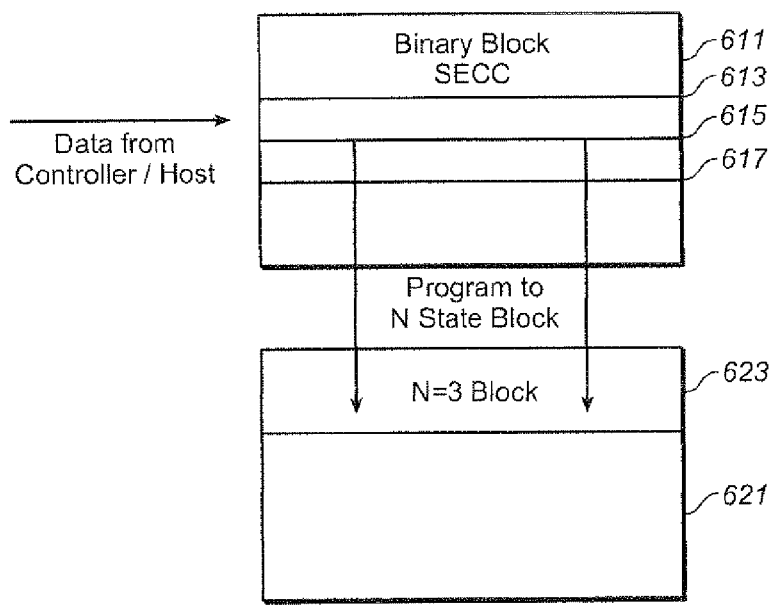
FIG. 12 outlines the on-memory folding process where the data from multiple word lines written in a binary format are rewritten into a multi-state format.

The idea of folding data from a binary to a multi-state, or MLC, format can be illustrated with FIG. 12 for one particular 3-bit per cell example. As shown by the arrow, data is received from the controller (or host) and written in binary format in a block 611 of the memory. Three of the written word lines (613, 615, 617) of the block 611 are explicitly shown. The content of these three word lines are then rewritten in a 3-bit per cell format along the single word line 623 of block 621, with the "folding" process accomplished on the memory itself. (More generally, if the data is written along 621 in an N-bit per cell format, the content of N-word lines of binary content would be folded up in this manner. This block 611 may specifically assigned to be operated in only binary mode or may be a block operable in a MLC mode by, for example, just the lowest page of multiple logical pages storable on a physical page. Similarly, block 621 may be assigned only for multi-state operation or may be operable in binary mode as well.

Figure 13:
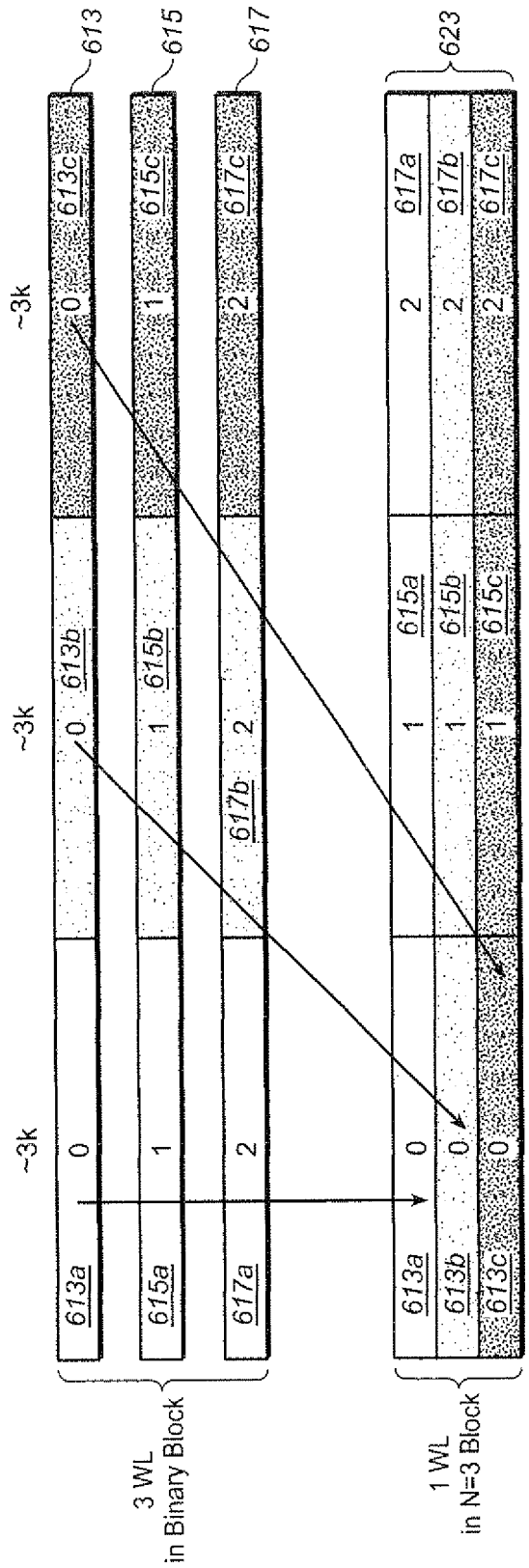
FIG. 13 illustrates aspects of the folding process in more detail.

Some detail on how one exemplary embodiment folds the data from the multiple binary format word lines into a single word line is shown in FIG. 13. At the top of FIG. 13 are the three word lines 613, 615, and 617, which are each split into three parts (a, b, c) of a third of the cells along a corresponding third of the bit lines (here taken as contiguous). On word line 623, the three thirds of the first word line (613a-c) are arranged onto to first third of the of the word line; similarly, the second binary word line 615 is folded and written into the middle third of 623 and the third word line from the binary block 617 is written into the last third of 623.

The process shown in FIG. 13 generalizes in a number of ways. A first of these is in the number of states stored per cell in the multi-state format. Although FIGS. 12 and 13 show the case where three pages of data are rewritten from three physical pages into multi-state format on a single physical page, other numbers of storage densities can be used. (For example, to simplify the following discussion, particularly that related to the register structure, the 2-bit per cell case will often be used as the exemplary embodiment.) Also, although full word lines (each here corresponding to a page) are shown, in system that allow partial page operation, partial pages may be used. Additionally, although FIG. 13 shows the case where cells along the word line are split into groups along contiguous bit lines for folding, other arrangements can be used. In the following sections, "folding" will generally refer to the sort of process where data is read from several locations in the binary section into the data read/write registers and then re-written into multi-state form in the MLC memory section, most easily visualized for the example of reading out N binary word lines and re-writing them on a single word line in N-bit per cell format; and although the folding can involve the sort of on-chip transpositions illustrated with respect to FIG. 13, more generally it may also be the more straight forward direct copy type of folding.

As noted above, the folding process is performed on the memory itself, so that once the data is transferred in from the controller (or host) and written in binary format, it is rewritten into the array without transferring it off the memory. The exemplary embodiments accomplish this by reading the data of the multiple binary word lines (e.g., 613, 615, 617) into the corresponding registers (or latches) associated with the array, rearranged within these registers into the form needed for multi-state programming, and then rewritten into a single word line (e.g., 623) of a multi-state block. Thus, under the arrangement of FIG. 13, the binary content of several (here 3) cells on the same word line, but along different bit lines, are read into the associated data registers, and then rearranged to correspond to the multi-bits of a single cell on a corresponding single bit line, from where it can be written.

Although this folding has here been described as folding N logical pages of data from N physical pages of binary memory to one physical page of N-bit per cell memory. (Here, the physical page is taken as a whole word line.) More generally, the logical data can be scattered in any fashion between physical pages. In this sense, it is not a direct 3-page to single page mapping, but is more of a mapping with 3-to-1 ratio. More detail on on-chip data folding is given in U.S. application Ser. No. 12/478,997 filed on Jun. 5, 2009. Further detail and structures useful for folding as also presented in U.S. application Ser. No. 12/478,997 filed on Jun. 5, 2009.

Binary/Multi-State Memory Using Folding

Figure 14:
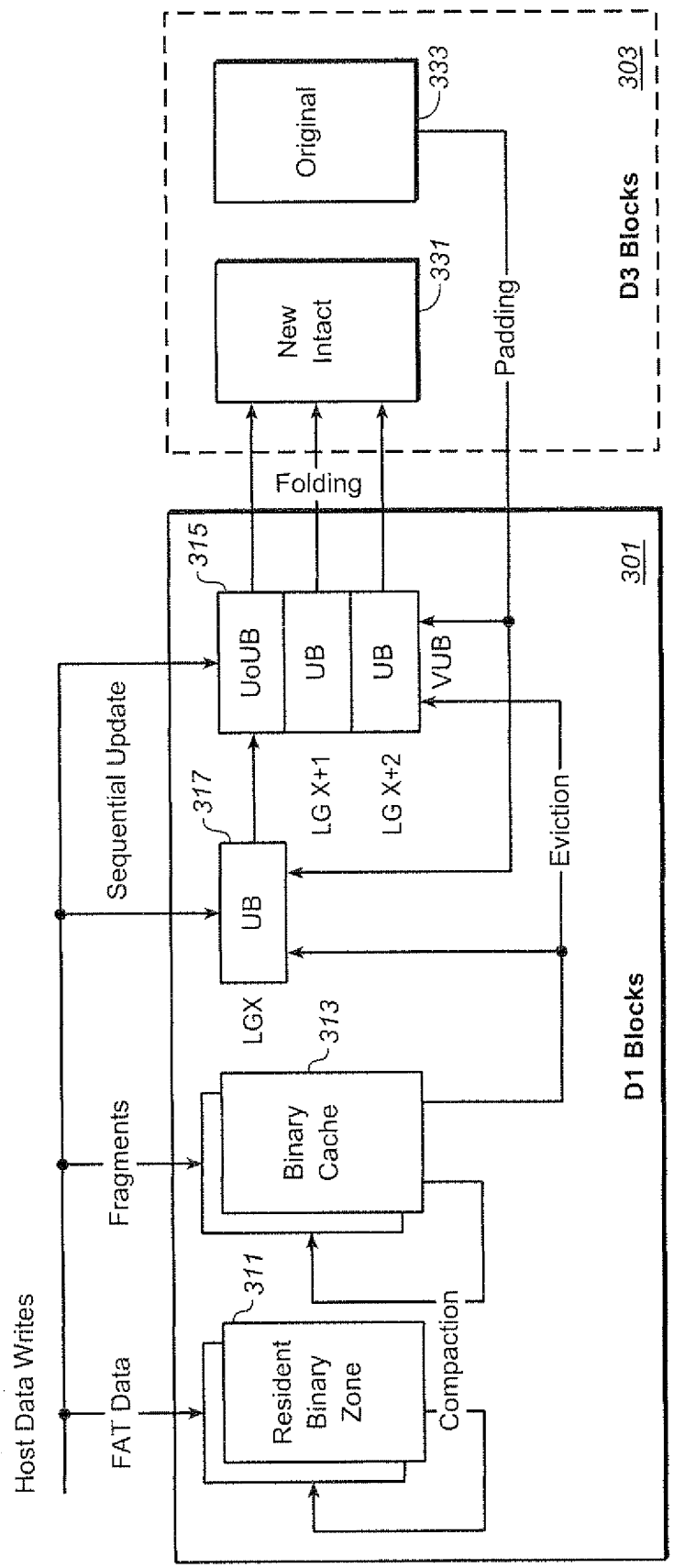
FIG. 14 shows another example of a non-volatile memory that includes both binary and multi-state memory portions.

FIG. 14 shows another example of a non-volatile memory that includes both binary and multi-state memory portions. The binary part of the memory, D1 blocks 301, includes both control data, such as file access tables (FAT), in the resident binary zone 311 and a binary cache area 313. For this discussion, these areas can be taken to be similar to those described above in the Binary Cache section above and the references cited therein. These areas are updated and compacted within themselves and do not enter further into this section. The memory also includes the multi-state (3-bit in this example) memory portion of D3 blocks 303. The D1 and D3 blocks 301 and 303 can be distributes across various semi-autonomous arrays (i.e., dies or planes within a die). (More generally, the distinction between where the updates may be stored in memory and the "bulk" storage need not be based on, or at least not characterized in terms of, binary versus multi-level, but could also be slow versus fast, relatively high endurance versus lower endurance, small block structure versus large block, or other qualitative property.)

In the exemplary embodiment, data is first written to the binary block 301 and then folded into D3 blocks. For example, once three 3 pages are written into the binary memory, then can then be folded into a single page in D3 memory 303 or follow the sort of diagonal lower-foggy-fine programming method described in "Atomic Program Sequence and Write Abort Detection" by Gorobets et al. having Ser. No. 12/642,740 and which is being filed concurrently herewith. In the on-chip folding embodiment, the binary and MLC portions will be from different blocks formed along the same bit lines. More generally, other rewrite techniques can be used. Although in some embodiments data may written directly to multi-state memory, under this arrangement discussed here user data is first written from the volatile RAM into binary memory and then "triplets" (for the D3 example) of pages, such as in 315 for the logical groups X, X+1 and X+2, that are then combined and stored in a multi-state format as a "newly intact" physical page 331, where it is stored along with other such previously written "original" pages 333. When data of one of the pages stored in a D3 block is updated, rather than store the updated data in a D3 block, this can, at least initially, stored in a binary block Update Block, or UB, 317, as is described in the next section. More detail on the embodiment shown in FIG. 14 can be found in U.S. patent application Ser. Nos. 12/642,584; 12/642,611; 12/642,649; 12/642,728; and 12/642,740, Use of Guard Bands and Phased Maintenance Non-volatile memory systems, such as those described above, perform various maintenance operations in addition to the reads, writes, or other operations initiated by the host. These memory systems needs to execute these maintenance operations along with the host initiated operations. Many memory systems interact with the host using a protocol (such as Secure Digital (SD) or other related products) have strict timing requirements on read and write operations. Exceeding the maximum latency timings allotted under these protocols results in timeout and protocol violation. Short host writes give a particular problem, as these have only a very limited time for maintenance operations.

The present section considers techniques to better incorporate the maintenance operations, particularly those of memory systems employing the sort of large block structures described above, into the memory system operations without trigger such timeout error. Although the following discussion will be presented in the context of a memory system having both a multi-state section and a binary section functioning as a cache, such as those discussed in the preceding sections, the techniques are more generally applicable. The techniques will first be presented using the exemplary embodiment of a binary cache arrangement, with the more general situation discussed afterwards.

The techniques presented in the section introduce one or more safety guard bands to more efficiently manage maintenance operations for such worst case write sequence. The exemplary embodiments will use such guard bands in both physical space and for management data, such as for indexing data structures (logical to physical mappings). This will be described in the contest of a binary cache structure, such as described above with respect to FIG. 11 or FIG. 14. This example will use a data space guard band, a Binary Cache Index (BCI) space guard band, and a spare DCI pages guard band. The system will use the guard band (or bands) to provide optimal recovery back to a base state by triggering and prioritising various binary cache clean-up and maintenance operations to safely move the guard bands as soon as possible to the base state without breaking the timing requirements. This can also include additional techniques such a more efficient BCI merge. (In addition to U.S. patent application Ser. Nos. 12/642,584; 12/642,611; 12/642,649; 12/642,728; and 12/642,740 cited above, further techniques specifically related to the Binary Cache Index can be found in a US patent application entitled "Techniques of Maintaining Logical to Physical Mapping Information in Non-Volatile Memory Systems", by Sergey Anatolievich Gorobets and Robert George Young, filed on the same day as the present application.

Figure 15:
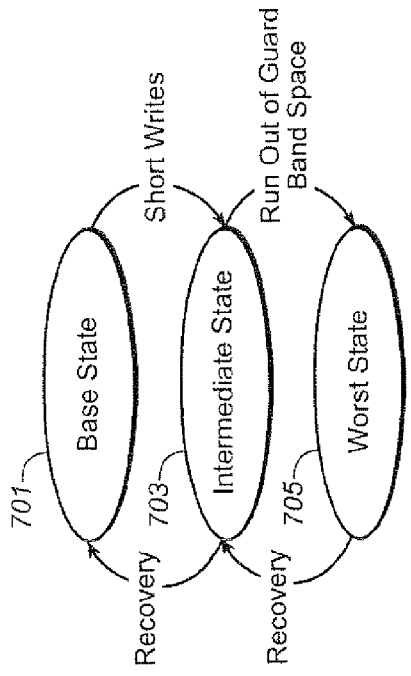
FIG. 15 illustrate the system state machine of an exemplary embodiment.

As short writes do not allow the memory to carry out maintenance operations, the techniques described here reserves guard bands. During longer host accesses, the guard bands will be maintained, while during short writes they will be used to ensure that write timeouts do not occur. Given a sufficient number or frequency of short writes, the guard bands will be exhausted and a host access the system may exceed the allotted latency and result in a timeout. This is shown in FIG. 15 by the system moving from a 'Base' state, to an 'Intermediate' state and finally to a 'Worst' state. The guard band sizes are chosen to handle the worst case host accesses that the system is specified to meet.

FIG. 15 is a system state machine diagram to illustrate the relationships and transitions between these states. In the Base state 701, there are no pending garbage collection or other maintenance operations to free up space for the guard band. As random or other short writes are performed, the system move in to the intermediate state 703, where there are some pending maintenance operations to free up space for guard bands. The system can add in such operations in a phased manner as long as the additional delays do not trigger a time out within the protocol. These operations are phased in until the system recovers to the Base state 701.

The exemplary embodiment also has allowance for a Worst state 705 when guard band becomes exhausted. This occurs when the number of random or other short writes is such that any new write may trigger a timeout due to maintenance operations to free up space for guard band. The system will execute enough garbage collection or other maintenance operations to allow the system to recovery back to the Intermediate state 703. Once in the Intermediate state, the system continues to recover into the Base state, unless it experiences a sufficient number of host activity to move it back into the Worst state.

The exemplary embodiment uses two guard band types, one for host data one for control data, such as the logical to physical conversion data of the BCI index. The guard band is an amount of capacity for such data. Depending on the implementation detail, this capacity may be rounded up to the page or block level. The maintain operations performed during recovery can be garbage collection as well as other maintenance or housekeeping operations (folding, wear-leveling, and so on) that the controller performs as part of managing the memory. Performing such operations in a phased manner is described, primarily in the contest of garbage collection, in U.S. Pat. Nos. 7,444,461 and 7,464,216 and US patent publication number 2008/0162612. Other examples of such housekeeping operations are given in U.S. Pat. No. 7,315, 917. A similar arrangement of phased operations can be used here, but without the sort of limitations due to a blocks capacity or the added extra of complexity of these previous approaches.

Figure 16:
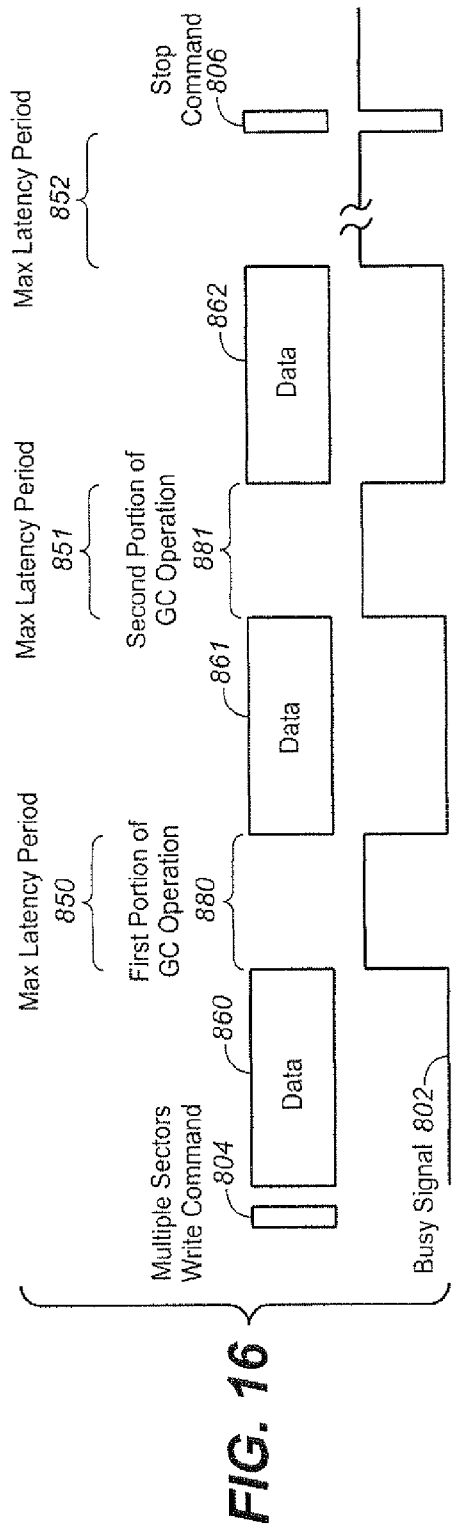
FIG. 16 shows a simplified block of a phased garbage collection operation.

FIG. 16 illustrates how a phased maintenance operation, here garbage collection, can be can be executed during a host access by exploiting the available latency in such an access. In this diagram, a garbage collection operation is split into multiple portions such as 880 and 881. The memory system receives a multi-sector write command 804 followed by multiple sector of data (860, 861, 862). The memory system asserts the busy signal 802 to allow execution of the write command, which may include any of the needed garbage collection or other operations. The host will not send another command or additional data while the busy signal is being asserted. The process continues until releasing busy signal 802 after the write operation is completed. Under the protocol being used by the host and memory system, the memory system is allotted a certain amount of time (the maximum allowed latency periods 850, 851, 852) for which it can assert the busy signal after receiving each unit of data. If the memory exceeds these maximum latency periods, the host may repeat the command or abort the process. As long as these maximum latencies are respected, the memory system can work in other operations. In addition to the SD-type protocols, other examples of protocols with such maximum latency periods include MS, or memory stick, and USB protocols, although these are typically not as strict as for Secure Digital protocols. Even for protocols with out such requirements, it may be preferable to avoid long BUSY periods in general, just to reduce "dips" in performance, which can be important for applications such as video capture that could otherwise be subject to buffer over-run.

Portions 880 and 881 of a garbage collection operation can then be allocated between these maximum allowed latency periods 850, 851, 852. In other words, the memory system can use each of the periods 850, 851, 852 to perform portions a larger maintenance operation, as long as the maximum latency allowed under the protocol are respected. (More detail can be found in U.S. Pat. No. 7,444,461, whose FIG. 7 has been adapted as FIG. 16 here.)

The exemplary embodiment of memory system with a binary cache uses both an index space guard band and a physical space guard band. Concerning the binary cache index space guard band, Binary Cache Indices (BCIs) store the physical locations of host data within the binary cache. Each index has limited capacity, with the exemplary system contains up to 128 BCIs. When a BCI has become full, another BCI is taken and the contents of initial BCI split between the original and the new. This is known as splitting a BCI and is discussed further in a US patent application entitled "Techniques of Maintaining Logical to Physical Mapping Information in Non-Volatile Memory Systems", by Sergey Anatolievich Gorobets and Robert George Young, cited above. To allow for such splitting, a number of spare BCI pages are allowed for a guard band in addition to the guard band of space within pages of the indices.

If all of the indices are in use and full, and the host attempts to write into the binary cache, then logical groups (LGs) have to be evicted from the binary memory section until sufficient space is recovered in a BCI. This mechanism can result in a system timeout. In Base state BCIs are split when there is still space for additional fragment information. This is the BCI guard band. In the Intermediate and Worst states, BCIs will be split only when 100% full, i.e. the guard band is used to ensure that host data can still be indexed even after a series of short writes.

With respect to the physical space guard band, physical space is also reserved in the binary cache for host data. If the system uses all of the physical space during short host writes, then logical group evictions are performed until enough space has been recovered for the host command to succeed. This may result in timeouts.

On every host access the state of the binary cache is monitored. If host writes have moved the system into 'Intermediate' or 'Worst' states, then corrective action is taken and recovery operations are performed. These corrective actions will be "phased", being split into smaller chunks as described above. Each chunk will fit within the protocol timeout limit. The number of recovery steps that can be carried out is limited by the length of the host command.

Figure 17:
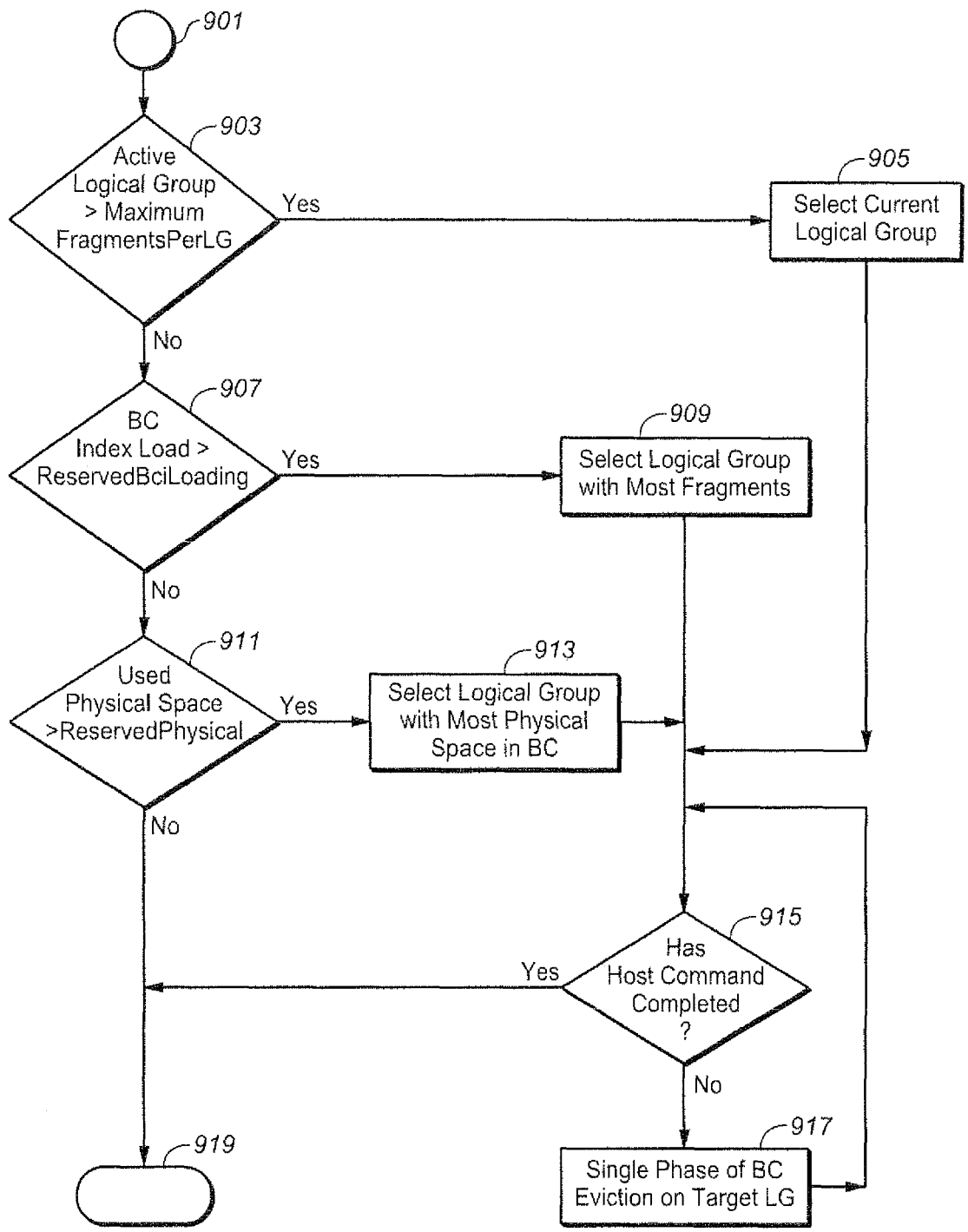
FIG. 17 is an exemplary embodiment for a recovery control algorithm.

FIG. 17 is a flow for an example of such a recovery control algorithm. Once the host sends a command to access the memory, the flow starts at 901. The first action is to determine whether the active logical group into which data would be written has exceeded the maximum number of fragments that the system allows for a logical group. If so, this current logical group is selected at 905 before moving on to 915; if not, the process moves to 907.

At 907 the index load is checked to see whether or not it exceeds the amount of reserved load and moved out of the Base state. If so, the logical group with the greatest number of fragments is selected at 909 before moving on to 915; if not, the process moves to 911 to check the guard band for physical space.

At 911, the amount of used physical space is checked. If it does not exceed the reserved amount, the system is in its Base state, no recovery is needed, and the algorithm ends at 919. If the amount of reserved physical space is exceeded, the logical group with the most free physical space is selected at 913 before moving to 915.

To reach 915, the algorithm has determined that the device has moved out of the Base state and recovery is needed. Once a logical group has been selected at 905, 909, or 913, 915 checks on whether there system can begin to perform a phased maintenance operation. If the command that triggered the flow at 901 is already completed, then process ends at 919. If not, at 917 the maintenance operation (here eviction on the selected logical group) contains a phase at a time until either the command completes (as determined by the loop back to 915) or the maintenance is complete and the system is back to its Base state.

The exemplary flow of FIG. 17 relies upon the controller to gather several set of statistics. The first of these (used at 903) is the maximum fragments per logical group. It is possible to have a logical group that has so many fragments that it fills an entire BCI. A BCI with a single LG cannot be split. If any additional fragment is added to the logical group in this index, then un-phased eviction must occur.

At 907 the algorithm uses the statistic of a BC Index Load. This index is a measure of fullness for the indexing system is and is the number of bytes in all BCIs used to store fragment information. (For example, an exemplary embodiment supports 128 BCIs, each of which is of a fixed physical size. The load is the sum of the current load of all of the BCIs.) If the system is using BCI guard bands, the BC Index Load value will be high. The BC Index Load can be stored in the BCI and, on initialization, be read from the last written BCI to obtain the state (whether base, intermediate, or worst) of the BCIs without having to read all of them to determine the fullness level. A third statistic, used at 91.1 to determine whether recovery is needed, the Used Physical Space, which is the space in the memory section, here binary cache, which has been used to contain host data and BCIs.

So far the various aspects of the techniques described here have been presented in the context of a memory having both a binary section, serving as a binary cache, and a multi-state section. The exemplary embodiment has considered maintenance operations for the binary cache related to logical group evictions. However, these techniques can be applied to more general situations. When a memory system, or a section of the memory, which requires various maintenance operations and is accessed by a host using a protocol that allows for a latency interval that has a maximum that cannot be exceeded without danger of triggering a time out, one or more guard bands and phased maintenance operations can be employed. The exemplary embodiment used a guard band for both host data and control data, but more general only a single guard band could be used or, conversely, multiple guard bands for each type. In any of these variations, an intermediate state is introduces where, once the amount of available free space in the memory section is reduced below a limit and enters the guard band region, a recovery phase is entered and pending maintenance operations are performed until the memory is back to its base state. The maintenance operation is then broke up into segments or phased which implemented during the available latency periods during the host access. This provides controller architectures for devices using such protocols to have a flexible limit for the "worst case" write sequence, up to the unlimited sequence if capacity allows.

CONCLUSION

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a memory system that includes a memory circuit having an array of non-volatile memory cells and a controller circuit, the controller overseeing the transfer of user data between a host and the memory array and managing the storage of user data on the memory array, the method comprising:

receiving by an interface of the controller of a first host command for a write operation to the non-volatile memory;

determining by logic circuitry of the controller of whether the execution of the first host command will result in the amount of free space available in a first section of the non-volatile memory decreasing below a first level, wherein the first section is an area of the non-volatile memory allotted for user data;

subsequently executing the first host command;

in response to determining that the execution of the first host command will result in the amount of free space available in the first section decreasing below the first level, while executing the first host command performing at least a portion of a maintenance operation to increase the amount of free space available in the first section, where the portion of the maintenance operation performed is based on the amount of time available during the first host command without exceeding a maximum latency;

determining by logic circuitry of the controller of whether the execution of the first host command will result in the amount of free space available in a second area of the non-volatile memory allotted for control data used by the controller in the management of the non-volatile memory system decreasing below a second level; and in response to determining that the execution of the first host command will result in the amount of free space available in the second area decreasing below the second level, while executing the first host command performing at least a portion of a maintenance operation to increase the amount of free space available in the second area, where the portion of the maintenance operation performed to increase the amount of free space available in the second area is based on the amount of time available during the first host command without exceeding a maximum latency.

2. The method of claim 1, further comprising:
- determining by logic circuitry of the controller of whether the execution of the first host command will result in the amount of free space available in first section decreasing below a third level, where the third level is of lesser free space than the first level; and
- in response to determining that the execution of the first host command will result in the amount of free space available in the first section decreasing below the third level, performing one or more maintenance operations to increase the amount of free space available above the third level prior to executing the first host command.

3. The method of claim 1, wherein the host and memory system operate according to a first protocol and wherein the amount of time available during the first host command without exceeding a maximum latency is determined by the requirements of the first protocol.

4. The method of claim 3, wherein the first protocol is an SD protocol.

5. The method of claim 1, wherein the first level is a number of free pages in the first section of the memory.

6. The method of claim 1, wherein the first level is a number of free blocks in the first section of the memory.

7. The method of claim 1, wherein the maintenance operation is a garbage collection operation.

8. The method of claim 1, wherein the maintenance operation is a wear leveling operation.

9. The method of claim 1, wherein the maintenance operation is a binary to multi-state folding operation.

10. The method of claim 1, wherein the memory circuit includes a plurality of erase blocks operated by the controller circuit in a binary mode and a plurality of erase blocks operated by the controller circuit in a multi-state mode, and wherein the maintenance operation is a binary to multi-state data folding operation.

11. The method of claim 1, wherein said performing at least a portion of a maintenance operation includes:
- executing a first phase of the maintenance operation;
- determining whether the first host command is completed; and
- in response to determining that the first host command is not completed, executing a second phase of the maintenance operation.

12. The method of claim 1, further comprising:
- maintaining by the controller of one or more sets of statistics on the amount of free space available in the first section, wherein the determining whether the execution of the first host command will result in the amount of free space available in a first section decreasing below a first level is based on comparing one or more of the sets of statistics to a corresponding guard band level.

13. The method of claim 1, further comprising determining a sub-section of the first section upon which to perform the at least a portion of the maintenance operation.

14. A method of operating a memory system that includes a memory circuit having an array of non-volatile memory cells and a controller circuit, the controller overseeing the transfer of user data between a host and the memory array and managing the storage of user data on the memory array, the method comprising:
- receiving by an interface of the controller of a first host command for a write operation to the non-volatile memory;
- determining by logic circuit of the controller of whether the execution of the first host command will result in the amount of free space available in a first section of the non-volatile memory decreasing below a first level, wherein the first section is an area of the non-volatile memory allotted for control data used by the controller in the management of the non-volatile memory system;
- subsequently executing the first host command;
- in response to determining that the execution of the first host command will result in the amount of free space available in the first section decreasing below the first level, while executing the first host command performing at least a portion of a maintenance operation to increase the amount of free space available in the first section, where the portion of the maintenance operation performed is based on the amount of time available during the first host command without exceeding a maximum latency, wherein the first section is a maximum number of pages that are allotted for said control data and the first level is a number of free pages in the first section.

15. The method of claim 14, wherein the control data includes logical to physical mapping data.

16. The method of claim 14, further comprising:
- determining by logic circuitry of the controller of whether the execution of the first host command will result in the amount of free space available in first section decreasing below a second level, where the second level is of lesser free space than the first level; and
- in response to determining that the execution of the first host command will result in the amount of free space available in the first section decreasing below the second level, performing one or more maintenance operations to increase the amount of free space available above the second level prior to executing the first host command.

17. The method of claim 14, wherein the host and memory system operate according to a first protocol and wherein the amount of time available during the first host command without exceeding a maximum latency is determined by the requirements of the first protocol.

18. The method of claim 17, wherein the first protocol is an SD protocol.

19. The method of claim 14, wherein the first level is a number of free pages in the first section of the memory.

20. The method of claim 14, wherein the first level is a number of free blocks in the first section of the memory.

21. The method of claim 14, wherein the maintenance operation is a garbage collection operation.

22. The method of claim 14, wherein the maintenance operation is a wear leveling operation.

23. The method of claim 14, wherein the maintenance operation is a binary to multi-state folding operation.

24. The method of claim 14, wherein the memory circuit includes a plurality of erase blocks operated by the controller circuit in a binary mode and a plurality of erase blocks operated by the controller circuit in a multi-state mode, and wherein the maintenance operation is a binary to multi-state data folding operation.

25. The method of claim 14, wherein said performing at least a portion of a maintenance operation includes:
- executing a first phase of the maintenance operation;
- determining whether the first host command is completed; and
- in response to determining that the first host command is not completed, executing a second phase of the maintenance operation.

26. The method of claim 14, further comprising:
- maintaining by the controller of one or more sets of statistics on the amount of free space available in the first section, wherein the determining whether the execution of the first host command will result in the amount of free space available in a first section decreasing below a first level is based on comparing one or more of the sets of statistics to a corresponding guard band level.

27. The method of claim 14, further comprising determining a sub-section of the first section upon which to perform the at least a portion of the maintenance operation.

28. A method of operating a memory system that includes a memory circuit having an array of non-volatile memory cells and a controller circuit, the controller overseeing the transfer of user data between a host and the memory array and managing the storage of user data on the memory array, the method comprising:

receiving by an interface of the controller of a first host command for a write operation to the non-volatile memory;

determining by logic circuitry of the controller of whether the execution of the first host command will result in the amount of free space available in a first section of the non-volatile memory decreasing below a first level wherein the first section is an area of the non-volatile memory allotted for control data used by the controller in the management of the non-volatile memory system;

subsequently executing the first host command;

in response to determining that the execution of the first host command will result in the amount of free space available in the first section decreasing below the first level, while executing the first host command performing at least a portion of a maintenance operation to increase the amount of free space available in the first section, where the portion of the maintenance operation performed is based on the amount of time available during the first host command without exceeding a maximum latency, wherein the first section is a maximum number of pages that are allotted for said control data and the first level is the amount of free space within one or more of the pages.

29. The method of claim 28, further comprising:

determining by logic circuitry of the controller of whether the execution of the first host command will result in the amount of free space available in first section decreasing below a second level, where the second level is of lesser free space than the first level; and in response to determining that the execution of the first host command will result in the amount of free space available in the first section decreasing below the second level, performing one or more maintenance operations to increase the amount of free space available above the second level prior to executing the first host command.

30. The method of claim 28, wherein the host and memory system operate according to a first protocol and wherein the amount of time available during the first host command without exceeding a maximum latency is determined by the requirements of the first protocol.

31. The method of claim 30, wherein the first protocol is an SD protocol.

32. The method of claim 28, wherein the first level is a number of free pages in the first section of the memory.

33. The method of claim 28, wherein the first level is a number of free blocks in the first section of the memory.

34. The method of claim 28, wherein the control data includes logical to physical mapping data.

35. The method of claim 28, wherein the maintenance operation is a garbage collection operation.

36. The method of claim 28, wherein the maintenance operation is a wear leveling operation.

37. The method of claim 28, wherein the maintenance operation is a binary to multi-state folding operation.

38. The method of claim 28, wherein the memory circuit includes a plurality of erase blocks operated by the controller circuit in a binary mode and a plurality of erase blocks operated by the controller circuit in a multi-state mode, and wherein the maintenance operation is a binary to multi-state data folding operation.

39. The method of claim 28, wherein said performing at least a portion of a maintenance operation includes:

executing a first phase of the maintenance operation;

determining whether the first host command is completed; and in response to determining that the first host command is not completed, executing a second phase of the maintenance operation.

40. The method of claim 28, further comprising:

maintaining by the controller of one or more sets of statistics on the amount of free space available in the first section, wherein the determining whether the execution of the first host command will result in the amount of free space available in a first section decreasing below a first level is based on comparing one or more of the sets of statistics to a corresponding guard band level.

41. The method of claim 28, further comprising determining a sub-section of the first section upon which to perform the at least a portion of the maintenance operation.

* * * * *